(12) United States Patent
Cui

(10) Patent No.: US 11,330,608 B2
(45) Date of Patent: May 10, 2022

(54) ELECTRONIC DEVICE, RADIO COMMUNICATION METHOD, AND COMPUTER READABLE STORAGE MEDIUM

(71) Applicants: Sony Corporation, Tokyo (JP); Tao Cui, Beijing (CN)

(72) Inventor: Tao Cui, Beijing (CN)

(73) Assignee: SONY CORPORATION, Tokyo (JP)

( * ) Notice: Subject to any disclaimer, the term of this patent is extended or adjusted under 35 U.S.C. 154(b) by 82 days.

(21) Appl. No.: 16/758,413

(22) PCT Filed: Feb. 3, 2019

(86) PCT No.: PCT/CN2019/074679
§ 371 (c)(1),
(2) Date: Apr. 23, 2020

(87) PCT Pub. No.: WO2019/154389
PCT Pub. Date: Aug. 15, 2019

(65) Prior Publication Data
US 2020/0252948 A1    Aug. 6, 2020

(30) Foreign Application Priority Data

Feb. 11, 2018    (CN) .......................... 201810140933.9

(51) Int. Cl.
*H04W 72/12* (2009.01)
*H04W 72/04* (2009.01)
*H04W 74/08* (2009.01)

(52) U.S. Cl.
CPC ....... *H04W 72/121* (2013.01); *H04W 72/042* (2013.01); *H04W 72/0446* (2013.01); *H04W 74/0808* (2013.01)

(58) Field of Classification Search
CPC ..... H04L 5/0094; H04L 27/26; H04L 5/0053; H04W 72/042; H04W 72/0446;
(Continued)

(56) References Cited

U.S. PATENT DOCUMENTS 8,982,833 B2 *   3/2015   Kroener ............... H04W 72/12
                                                   370/330
10,506,586 B2 *  12/2019  Lee ....................... H04W 72/12
(Continued)

FOREIGN PATENT DOCUMENTS

CN          106941724 A      7/2017

OTHER PUBLICATIONS

Extended European Search Report dated Nov. 10, 2020 in European Patent Application No. 19750378.2, 11 pages.
(Continued)

*Primary Examiner* — Man U Phan
(74) *Attorney, Agent, or Firm* — Xsensus LLP

(57) ABSTRACT

An electronic device, a radio communication method, and a computer readable storage medium. The electronic device comprises a processing circuit, and is configured to use a group common-physical downlink control channel (GC-PDCCH) to transmit control information relating to data in a time slot preceding a time slot of the GC-PDCCH. In the invention, a GC-PDCCH can be better designed according to characteristics of an NR communication system.

19 Claims, 12 Drawing Sheets

(58) Field of Classification Search
CPC ........... H04W 74/0808; H04W 72/121; H04W 72/12; H04W 72/04; H04W 74/08
USPC ......................................................... 370/329
See application file for complete search history.

(56) References Cited

U.S. PATENT DOCUMENTS

| | | | | |
|---|---|---|---|---|
| 10,660,090 | B2* | 5/2020 | Lee | H04W 72/0446 |
| 10,924,205 | B2* | 2/2021 | Jo | H04L 5/0051 |
| 10,986,620 | B2* | 4/2021 | Fu | H04L 5/0082 |
| 11,102,817 | B2* | 8/2021 | Zhang | H04L 5/0091 |
| 2006/0209970 | A1* | 9/2006 | Kanterakis | H04L 1/0006 375/259 |
| 2017/0150367 | A1* | 5/2017 | Han | H04L 5/0092 |
| 2018/0227934 | A1* | 8/2018 | Yang | H04W 72/121 |
| 2020/0077392 | A1* | 3/2020 | Deng | H04L 5/0094 |
| 2020/0077393 | A1* | 3/2020 | Lee | H04W 72/12 |
| 2020/0221485 | A1* | 7/2020 | Cirik | H04B 7/0695 |
| 2020/0245357 | A1* | 7/2020 | Cui | H04W 16/14 |
| 2020/0275441 | A1* | 8/2020 | Lee | H04W 72/0446 |
| 2021/0014893 | A1* | 1/2021 | Park | H04L 5/0092 |
| 2021/0022181 | A1* | 1/2021 | Kwak | H04W 76/27 |
| 2021/0076418 | A1* | 3/2021 | Schober | H04W 74/0808 |
| 2021/0084683 | A1* | 3/2021 | Li | H04W 16/14 |
| 2021/0195579 | A1* | 6/2021 | Lei | H04W 72/042 |

OTHER PUBLICATIONS

CATT, "[89-20] email discussion: Group-common PDCCH for NR", 3GPP TSG RAN WG1 Meeting #AH_NR2, R1-1710968, Qingdao, P. R. China, Jun. 27-30, 2017, XP051305938, 22 pages.
WILUS Inc., "Consideration on Common PDCCH for NR", 3GPP TSG RAN WG1 Meeting #88bis, R1-1705847, Spokane, USA; Apr. 3-7, 2017, XP051243959, 5 pages.
WILUS Inc., "Discussion on contents for group-common PDCCH for NR", 3GPP TSG RAN WG1 NR Ad-Hoc#2, R1-1711356, Qingdao, P. R. China, Jun. 27-30, 2017, XP051305524, 4 pages.
AT&T, "Attaching common UE-ID for group common PDCCH", 3GPP TSG RAN WG1 Meeting #89, R1-1707743, Hangzhou, P. R. China, May 15-19, 2017, XP051272947, 5 pages.
International Search Report and Written Opinion dated Apr. 11, 2019 for PCT/CN2019/074679 filed on Feb. 3, 2019, 10 pages including English Translation of the International Search Report.
AT&T, "Design of the Group Common PDCCH," 3GPP TSG RAN WG1 Meeting #88, R1-1702273, Athens, Greece, Feb. 13-17, 2017, pp. 1-2.
CATT, "Further details of group-common control," 3GPP TSG RAN WG1 Meeting #88bis, R1-1704572, Spokane, USA, Apr. 3-7, 2017, 5 pages.
OPPO, "Remaining issues on GC-PDCCH," 3GPP TSG RAN WG1 Meeting AH 1801, R1-1800496, Vancouver, Canada, Jan. 22-26, 2018, 7 pages.

* cited by examiner

2
ELECTRONIC DEVICE, RADIO COMMUNICATION METHOD, AND COMPUTER READABLE STORAGE MEDIUM

CROSS-REFERENCE TO RELATED APPLICATIONS

The present application is based on PCT filing PCT/CN2019/074679, filed Feb. 3, 2019, which claims priority to Chinese Patent Application No. 201810140933.9, filed Feb. 11, 2018 with the Chinese Patent Office, each of which is incorporated herein by reference in its entirety.

FIELD

Embodiments of the present disclosure generally relate to the field of wireless communications, and in particular to an electronic device, a wireless communication method, and a computer-readable storage medium. More particularly, the present disclosure relates to an electronic device serving as a network side device in a wireless communication system, an electronic device serving as a user equipment in a wireless communication system, a wireless communication method performed by a network side device in a wireless communication system, a wireless communication method performed by a user equipment in a wireless communication system, and a computer-readable storage medium.

BACKGROUND

In the New Radio (NR) communication system, a new control channel, that is, a Group Common-Physical Downlink Control Channel (GC-PDCCH) is introduced, which is mainly used by a base station device to indicate downlink control information, such as Time slot Format related Information (SFI) to a group of user equipments. The SFI is used to indicate the SFI format adopted by the base station in the current time slot and/or one or more subsequent time slots, that is, a ratio of the numbers of uplink and downlink symbols in a time slot. However, there is not a common agreement on the configuration of the GC-PDCCH according to the conventional standards.

Compared with the Long Term Evolution (LTE) communication system, the NR communication system is greatly improved. For example, in the NR communication system, there are different subcarrier intervals and symbol-level uplink and downlink transmission is supported. Therefore, for unlicensed spectrums, the requirement for detection of idle channels poses a challenge to the design of the GC-PDCCH.

Therefore, it is required to propose a technical solution to improve the design of the GC-PDCCH according to the characteristics of the NR communication system.

SUMMARY

This summary part provides a general summary of the present disclosure, rather than discloses a full scope or all features thereof.

An object of the present disclosure is to provide an electronic device, a wireless communication method, and a computer-readable storage medium to design a GC-PDCCH according to the characteristics of the NR communication system.

According to an aspect of the present disclosure, an electronic device is provided, which includes a processing circuit configured to transmit control information related to data in a previous time slot of a time slot where a group common physical downlink control channel GC-PDCCH is located through the GC-PDCCH.

According to another aspect of the present disclosure, an electronic device is further provided, which includes a processing circuit configured to: receive information through a group of common physical downlink control channels (GC-PDCCH); and demodulate the information to obtain the control information related to data in a previous time slot of a time slot where the GC-PDCCH is located.

According to another aspect of the present disclosure, a wireless communication method is further provided, which includes: transmitting control information related to data in a previous time slot of a time slot where a group common physical downlink control channel GC-PDCCH is located through the GC-PDCCH.

According to another aspect of the present disclosure, a wireless communication method is further provided, which includes: receiving information through a group of common physical downlink control channels (GC-PDCCH); and demodulating the information to obtain the control information related to data in a previous time slot of a time slot where the GC-PDCCH is located.

According to another aspect of the present disclosure, a computer-readable storage medium is further provided, which includes executable computer instructions. The executable computer instructions, when being executed by a computer, cause the computer to perform the wireless communication method according to the present disclosure.

With the electronic device, the wireless communication method, and the computer-readable storage medium according to the present disclosure, control information related to data in a previous time slot of a time slot where a GC-PDCCH is located can be transmitted through the GC-PDCCH, such that the user equipment can correctly decode the data in the previous time slot, thereby improving the channel utilization rate.

Further application fields will become apparent from the descriptions herein. The description and specific examples in the summary are only illustrative and are not intended to limit the scope of the present disclosure.

BRIEF DESCRIPTION OF THE DRAWINGS

The drawings described herein are used for showing the selected embodiments, rather than all of the possible embodiments, and are not intended to limit the scope of the present disclosure. In the drawings.

Figure 1:
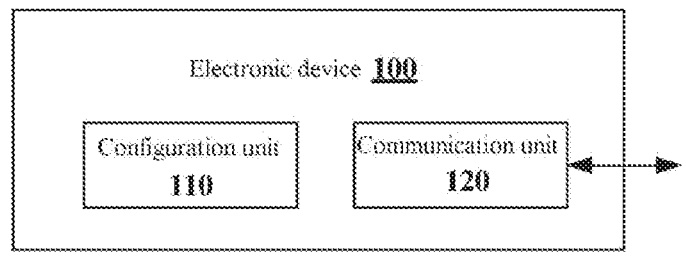
FIG. 1 is a block diagram showing an example of a configuration of an electronic device according to an embodiment of the present disclosure.

Although the present disclosure is susceptible to various modifications and substitutions, specific embodiments thereof are shown in the drawings as an example and are described in detail herein. However, it should be understood that the description for specific embodiments herein is not intended to limit the present disclosure into a disclosed particular form, but rather, the present disclosure aims to cover all modifications, equivalents and substitutions within the spirit and scope of the present disclosure. It should be noted that, throughout the drawings, a numeral indicates a component corresponding to the numeral.

DETAILED DESCRIPTION OF EMBODIMENTS

Examples of the present disclosure are described now more fully with reference to the drawings. The following description is merely exemplary substantively and is not intended to limit the present disclosure and an application or use thereof.

Exemplary embodiments are provided below to make the present disclosure thorough and convey a scope of the present disclosure to those skilled in the art. Examples of various specific details, such as specific elements, devices, and methods, are set forth to provide thorough understanding for the embodiments of the present disclosure. It is apparent to those skilled in the art that the exemplary embodiments may be embodied in multiple different forms without using specific details, and should not be construed as limiting the scope of the present disclosure. In some exemplary embodiments, well-known processes, well-known structures, and well-known technology are not described in detail.

The description will be made in the following order.
1. Description of a scenario
2. Configuration example of a network side device
2.1 Carrying a downstream transmission termination position through a GC-PDCCH
2.2 Carrying a length and a time domain position of a MCOT through a GC-PDCCH
2.3 Carrying information on whether to perform a channel detection process before performing uplink transmission in a MCOT through a GC-PDCCH
2.4 Carrying parameter information of a channel detection process through a GC-PDCCH
2.5 Carrying control information related to data in a previous time slot through a GC-PDCCH
2.6 Transmitting a GC-PDCCH in an immediately following time slot in a case that the GC-PDCCH is not transmitted in a previous time slot
2.7 Carrying a downlink transmission starting position
3. Configuration example of a user equipment
3.1 Receiving a downlink transmission termination position through a GC-PDCCH
3.2 Receiving a length and a time domain position of a MCOT through a GC-PDCCH
3.3 Receiving, through a GC-PDCCH, information on whether to perform a channel detection process before performing uplink transmission in a MCOT
3.4 Receiving parameter information of a channel detection process through a GC-PDCCH 3.5 Receiving control information related to data in a previous time slot through a GC-PDCCH
3.6 Receiving a downlink transmission starting position
4. Method embodiment
5. Application examples

1. Description of a Scenario

A new control channel GC-PDCCH is introduced in the NR communication system, which is used by a base station device to indicate downlink control information to a group of user equipments within the coverage of the base station. An electronic device in a wireless communication system, a wireless communication method performed by the electronic device in the wireless communication system, and a computer-readable storage medium are provided according to the present disclosure, to improve the design of the GC-PDCCH according to the characteristics of the NR communication system.

Technical solutions of the present disclosure may be applied to a wireless communication system, for example, an NR communication system of the fifth generation communication system (5G).

The network side device according to the present disclosure may be a base station device, for example, an eNB, or a base station (gNB) in the fifth generation communication system.

The user equipment according to the present disclosure may be a mobile terminal (such as a smartphone, a tablet personal computer (PC), a notebook PC, a portable game terminal, a portable/dongle-type mobile router, and a digital camera device), or an in-vehicle terminal (such as a car navigation device). The user equipment may also be realized as a terminal (which is also called a machine type communication (MTC) terminal) that performs machine-to-machine (M2M) communication. In addition, the user equipment may be a wireless communication module (such as an integrated circuit module including a single die) mounted on each of the terminals described above.

2. Configuration Example of a Network Side Device

FIG. 1 is a block diagram showing an example of a configuration of an electronic device 100 according to an embodiment of the present disclosure. The electronic device 100 herein may serve as a network side device in a wireless communication system. Specifically, the electronic device 100 may serve as a base station device in an NR communication system.

As shown in FIG. 1, the electronic device 100 may include a configuration unit 110 and a communication unit 120.

Here, each unit of the electronic device 100 may be included in a processing circuit. It should be noted that the electronic device 100 may include one or more processing circuits. Further, the processing circuit may include various discrete functional units to perform various different functions and/or operations. It should be noted that these functional units may be physical entities or logical entities, and units with different names may be implemented by the same physical entity.

According to an embodiment of the present disclosure, the configuration unit 110 may be configured to configure downlink information to be transmitted, including downlink information transmitted through a GC-PDCCH, a PDCCH, an Enhanced Physical Downlink Control Channel (ePDCCH) and high-level signaling, and the communication unit 120 may be configured to transmit the downlink information to a user equipment within the coverage of the electronic device 100.

According to an embodiment of the present disclosure, the electronic device 100 may transmit information carried on the GC-PDCCH by using an unlicensed spectrum. Further, the electronic device 100 may also transmit the information carried on the GC-PDCCH by using a licensed spectrum, such as a main carrier. In this way, the electronic device 100 may ensure the reliability of the information transmitted through the GC-PDCCH.

According to an embodiment of the present disclosure, the electronic device 100 may transmit various kinds of information through the GC-PDCCH, which will be described in detail below. Further, according to an embodiment of the present disclosure, the electronic device 100 may carry one or more kinds of the following information (as described in parts 2.1 to 2.6) by using downlink control information (DCI), which may be, but is not limited to, DCI format 2_x (a DCI format in the NR communication system, which is used to carry other information except uplink scheduling and downlink scheduling).

According to an embodiment of the present disclosure, the electronic device 100 may also carry the following information (as described in part 2.7) through high-level signaling, which may be, but is not limited to, radio resource control (RRC) signaling.

<2.1 Carrying a Downlink Transmission Termination Position Through a GC-PDCCH>

According to an embodiment of the present disclosure, the configuration unit 110 may be configured to configure information of a downlink transmission termination position for an unlicensed spectrum, and carry the information of the downlink transmission termination position for the unlicensed spectrum through a GC-PDCCH. Here, the electronic device 100 may determine the downlink transmission termination position before performing downlink transmission each time. According to the embodiment of the present disclosure, the downlink transmission termination position indicates a position of an OFDM symbol for termination of the downlink transmission, which includes, but is not limited to, a position of a time slot where the OFDM symbol for termination is located and a position of the OFDM symbol in the time slot.

According to an embodiment of the present disclosure, the communication unit 120 may transmit the information of the downlink transmission termination position for the unlicensed spectrum through the GC-PDCCH.

Figure 2:
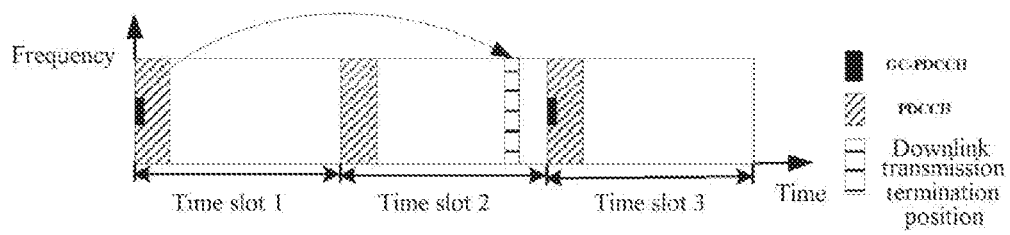
FIG. 2 is a schematic diagram showing a process of transmitting a downlink transmission termination position for an unlicensed spectrum through a GC-PDCCH according to an embodiment of the present disclosure.

FIG. 2 is a schematic diagram showing a process of transmitting a downlink transmission termination position for an unlicensed spectrum through a GC-PDCCH according to an embodiment of the present disclosure. As shown in FIG. 2, the horizontal axis indicates a time, and the vertical axis indicates a frequency. FIG. 2 shows a situation for three time slots (a time slot 1, a time slot 2 and a time slot 3). The oblique shaded region indicates a region occupied by the PDCCH, such as the first three OFDM symbols in each time slot. The black solid region indicates a region occupied by the GC-PDCCH. As shown in FIG. 2, the GC-PDCCH is located in a region of the PDCCH. That is, the GC-PDCCH is located in time within the OFDM symbol occupied by the PDCCH and is located in frequency in the subcarrier occupied by the PDCCH. FIG. 2 exemplarily shows a case that the transmission period of the GC-PDCCH is two time slots. Therefore, in FIG. 2, the regions of PDCCH in time slots 1 and 3 include the GC-PDCCHs. The horizontal shaded region indicates downlink a downlink transmission termination position for the unlicensed spectrum, that is, the downlink transmission for the unlicensed spectrum is to be terminated at the OFDM symbol where the horizontal shaded region is located. According to an embodiment of the present disclosure, the information of the downlink transmission termination position for the unlicensed spectrum may be transmitted through the GC-PDCCH. As shown in FIG. 2, the information of the downlink transmission termination position for the unlicensed spectrum may be transmitted through the GC-PDCCH in the time slot 1, and the information may include position information of the OFDM symbol where the downlink transmission termination position is located.

As described above, according to the embodiment of the present disclosure, the information of the downlink transmission termination position for the unlicensed spectrum may be transmitted through the GC-PDCCH. In this way, compared with a case that the public search region of the PDCCH is directed to user equipments in an entire cell, the GC-PDCCH is directed to a group of user equipments, thereby reducing a range of users to a certain extent. Compared with a case that a UE-specific search region of the PDCCH is directed to a specific user equipment, the GC-PDCCH is directed to a group of user equipments, thereby saving signaling overhead. Further, since the GC-PDCCH only includes a search space of one aggregation level, the information of the downlink transmission termination position for the unlicensed spectrum is transmitted through the GC-PDCCH, thereby improving the speed of blind detection by the users. In addition, after the user equipment obtains the information of the downlink transmission termination position, when the user equipment multiplexes the unlicensed spectrum for downlink transmission to perform uplink transmission, the downlink data may be decoded as early as possible to prepare for idle channel detection, thereby improving the utilization rate of the unlicensed spectrum.

According to an embodiment of the present disclosure, the configuration unit 110 may be configured to configure information transmitted through a PDCCH, to carry information of a downlink transmission termination position for an unlicensed spectrum through the PDCCH. For example, the configuration unit 110 may carry the information of the downlink transmission termination position for the unlicensed spectrum through a public search region or a UE-specific search region of the PDCCH. Further, the communication unit 120 may retransmit the information of the downlink transmission termination position for the unlicensed spectrum through the PDCCH. Further, the configuration unit 110 may carry the information of the downlink transmission termination position for the unlicensed spectrum through both the PDCCH and the GC-PDCCH in the same time slot.

Figure 3:
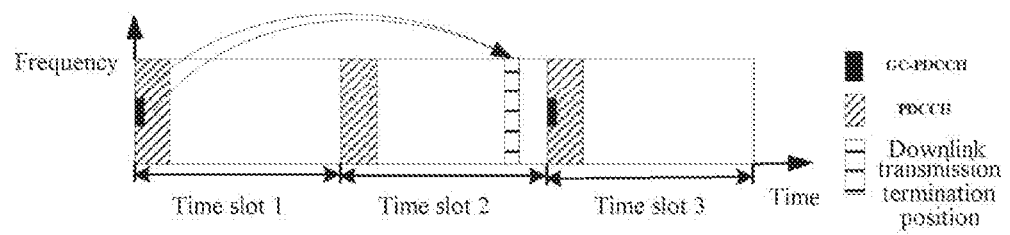
FIG. 3 is a schematic diagram showing a process of transmitting a downlink transmission termination position for an unlicensed spectrum through a GC-PDCCH and a Physical Downlink Control Channel (PDCCH) according to an embodiment of the present disclosure.

FIG. 3 is a schematic diagram showing a process of transmitting a downlink transmission termination position for an unlicensed spectrum through a GC-PDCCH and a PDCCH according to an embodiment of the present disclosure. In FIG. 3, the horizontal axis indicates a time, and the vertical axis indicates a frequency. FIG. 3 shows a situation for three time slots (a time slot 1, a time slot 2 and a time slot 3). The oblique shaded region indicates a region occupied by the PDCCH, for example, the first three OFDM symbols in each time slot, and the black solid region indicates a region occupied by the GC-PDCCH. In addition, exemplarily, the transmission period of the GC-PDCCH is two time slots. As shown in FIG. 3, the information of the downlink transmission termination position for the unlicensed spectrum is transmitted through the GC-PDCCH in the time slot 1, and is re-transmitted through the PDCCH. It is to be noted that FIG. 3 shows a case that the information of the downlink transmission termination position is transmitted only through the PDCCH in the time slot 1. The electronic device 100 may also transmit the downlink transmission termination position through only the PDCCH in the time slot 2, or through the PDCCH in the time slot 1 and the PDCCH in the time slot 2.

As described above, according to the embodiment of the present disclosure, the information of the downlink transmission termination position for the unlicensed spectrum is transmitted through the GC-PDCCH and the PDCCH. In this way, the user equipment can be prevented from not receiving the GC-PDCCH or from incorrectly decoding the information carried on the GC-PDCCH.

According to an embodiment of the present disclosure, the configuration unit 110 may be configured to configure the information transmitted through the GC-PDCCH to transmit the downlink transmission termination position for the unlicensed spectrum through the GC-PDCCHs in multiple time slots. That is, the downlink transmission termination position may be transmitted through the GC-PDCCHs located in multiple time slots (including the time slot where the downlink transmission termination position is located) before the downlink transmission termination position.

Figure 4:
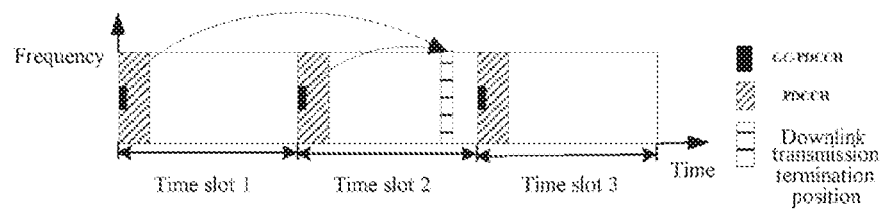
FIG. 4 is a schematic diagram showing a process of transmitting a downlink transmission termination position for an unlicensed spectrum through GC-PDCCHs in multiple time slots according to an embodiment of the present disclosure.

FIG. 4 is a schematic diagram showing a process of transmitting a downlink transmission termination position for an unlicensed spectrum through GC-PDCCHs in multiple time slots according to an embodiment of the present disclosure. In FIG. 4, the horizontal axis indicates a time, and the vertical axis indicates a frequency. FIG. 4 shows a situation for three time slots (a time slot 1, a time slot 2 and a time slot 3). The oblique shaded region indicates a region occupied by the PDCCH, for example, the first three OFDM symbols in each time slot, and the black solid region indicates a region occupied by the GC-PDCCH. In addition, exemplarily, the transmission period of the GC-PDCCH is one time slot, that is, regions of the PDCCH in the time slot 1, the time slot 2 and the time slot 3 include the GC-PDCCH. As shown in FIG. 4, the downlink transmission termination position is located within the time slot 2, and information of the downlink transmission termination position is transmitted through the GC-PDCCHs in the time slot 1 and the time slot 2.

As described above, according to the embodiment of the present disclosure, the information of the downlink transmission termination position for the unlicensed spectrum may be transmitted through the GC-PDCCH in one or more time slots, thereby increasing a probability of the user equipment to receive and correctly demodulate the downlink transmission termination position.

According to an embodiment of the present disclosure, the configuration unit 110 may be configured to configure the information transmitted through the GC-PDCCH to transmit the information of the downlink transmission termination position through the GC-PDCCH in the time slot where the downlink transmission termination position is located, or through the GC-PDCCH in a time slot before the time slot where the downlink transmission termination position is located. That is, the electronic device 100 may transmit the downlink transmission termination position through the GC-PDCCH in the Nth time slot before the downlink transmission termination position. Here, N is a non-negative integer. When N is a positive integer, it is indicated that the electronic device 100 transmits the downlink transmission termination position through the GC-PDCCH in a time slot before the time slot where the downlink transmission termination position is located. When N=0, it is indicated that the electronic device 100 transmits the downlink transmission termination position through the GC-PDCCH in the time slot where the downlink transmission termination position is located.

According to an embodiment of the present disclosure, since the configuration unit 110 may configure the information transmitted through the GC-PDCCH to transmit the information of the downlink transmission termination position through the GC-PDCCHs in one or more time slots, N may have multiple values. In other words, the electronic device 100 may transmit the information of the downlink transmission termination position through the GC-PDCCH in the time slot where the downlink transmission termination position is located, and may also transmit the information of the downlink transmission termination position through the GC-PDCCH in a time slot before the time slot where the downlink transmission termination position is located.

Figure 5:
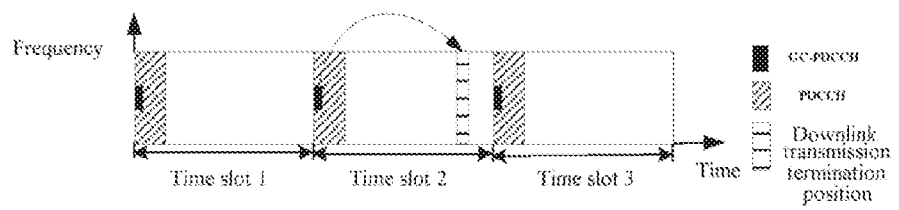
FIG. 5 is a schematic diagram showing a process of transmitting a downlink transmission termination position through a GC-PDCCH in a time slot where the downlink transmission termination position is located according to an embodiment of the present disclosure.

FIG. 2 and FIG. 3 show examples in which information of a downlink transmission termination position is transmitted only through a GC-PDCCH in a time slot before a time slot where the downlink transmission termination position is located. As shown in FIG. 2 and FIG. 3, the downlink transmission termination position is located in the time slot 2, and the downlink transmission termination position is transmitted through the GC-PDCCH in the time slot 1. FIG. 4 shows an example of transmitting the information of the downlink transmission termination position through the GCPDCCH in the time slot where the downlink transmission termination position is located and the GC-PDCCH in a time slot before the time slot where the downlink transmission termination position is located. As shown in FIG. 4, the downlink transmission termination position is located in the time slot 2, and the downlink transmission termination position is transmitted through the GC-PDCCH in the time slot 2 and the GC-PDCCH in the time slot 1. FIG. 5 is a schematic diagram showing a process of transmitting a downlink transmission termination position only through a GC-PDCCH in a time slot where the downlink transmission termination position is located according to an embodiment of the present disclosure. As shown in FIG. 5, the downlink transmission termination position is located in the time slot 2, and the downlink transmission termination position is transmitted through the GC-PDCCH in the time slot 2.

As described above, according to the embodiment of the present disclosure, the number and position (a time slot) of a GC-PDCCH for carrying information of the downlink transmission termination position for an unlicensed spectrum can be configured flexibly. A process of determining a time slot where a GC-PDCCH for carrying a downlink transmission termination position is located is described below.

According to an embodiment of the present disclosure, the configuration unit 110 may be configured to determine the value of N (that is, a time slot where a GC-PDCCH for carrying the downlink transmission termination position is located) according to one or more of the following parameters: a length of a max channel occupy time MCOT for downlink transmission; a transmission period of the GC-PDCCH; and a length of an OFDM symbol in the MCOT for downlink transmission.

According to an embodiment of the present disclosure, the configuration unit 110 may be configured to determine a time slot where a GC-PDCCH for carrying a downlink transmission termination position is located according to the length of the MCOT. According to an embodiment of the present disclosure, when the configuration unit 110 configures the time slot where the GC-PDCCH for carrying the downlink transmission termination position is located, the time slot is required to be located in the MCOT of the current downlink transmission.

Figure 6:
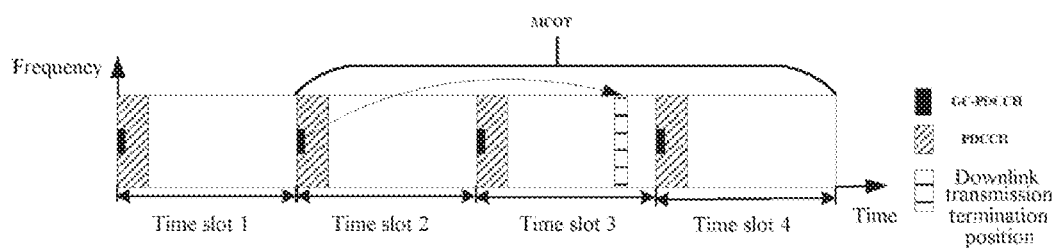
FIG. 6 is a schematic diagram showing a process of determining a time slot where a GC-PDCCH used to transmit a downlink transmission termination position is located according to a length of a Max Channel Occupy Time (MCOT) according to an embodiment of the present disclosure.

FIG. 6 is a schematic diagram showing a process of determining a time slot where a GC-PDCCH for transmitting a downlink transmission termination position is located according to a length of a MCOT according to an embodiment of the present disclosure. As shown in FIG. 6, the MCOT for the current downlink transmission includes a time slot 2, a time slot 3, and a time slot 4. Therefore, FIG. 6 shows a case that the downlink transmission termination position is carried through a GC-PDCCH in the time slot 2. However, the downlink transmission termination position may also be carried through a GC-PDCCH in the time slot 3. In other words, a time slot where a GC-PDCCH for carrying the downlink transmission termination position is located is required to be located in the MCOT of the current downlink transmission.

According to an embodiment of the present disclosure, the configuration unit 110 may be configured to determine a time slot where a GC-PDCCH for carrying a downlink transmission termination position is located according to a transmission period of the GC-PDCCH. According to an embodiment of the present disclosure, the electronic device 100 may periodically transmit the GC-PDCCH, and may configure a period of the GC-PDCCH, which may include, for example, one or more time slots.

In one aspect, according to an embodiment of the present disclosure, it may be determined a PDCCH in which time slots includes a GC-PDCCH based on the transmission period of the GC-PDCCH. In another aspect, according to an embodiment of the present disclosure, the time slot format related information SFI may be transmitted through the GC-PDCCH. For example, a GC-PDCCH in a time slot may be used to carry the SFI in the time slot or one or more time slots after the time slot. Therefore, the transmission period of the GC-PDCCH may be used to determine a GC-PDCCH in this time slot can carry SFIs of how many time slots before this time slot. Here, only if the SFI of a time slot where the downlink transmission termination position is located is known can the downlink transmission termination position be determined. Therefore, according to the embodiment of the present disclosure, when the configuration unit 110 configures a time slot where the GC-PDCCH for carrying the downlink transmission termination position is located, the following time slot may be selected: a GC-PDCCH in the time slot also carries SFI of the time slot where the downlink transmission termination position is located.

According to an embodiment of the present disclosure, the configuration unit 110 may be configured to configure information transmitted through the GC-PDCCH to transmit the time slot format related information SFI of the time slot where the downlink transmission termination position is located through the GC-PDCCH. That is, the GC-PDCCH for carrying the information of the downlink transmission termination position also carries the SFI of the time slot where the downlink transmission termination position is located.

According to an embodiment of the present disclosure, the configuration unit 110 may be configured to determine a time slot where a GC-PDCCH for carrying a downlink transmission termination position is located according to a length of an OFDM symbol in a MCOT for downlink transmission. In the NR communication system, for different subcarrier intervals, the OFDM symbol has different lengths in time. Table 1 shows a relationship between a subcarrier interval and a length of the OFDM symbol.

TABLE 1

| Subcarrier interval (kHZ) | Length of the OFDM symbol (not including cyclic prefix) (μs) | Length of the OFDM symbol (including cyclic prefix) (μs) |
|---|---|---|
| 15 | 66.70 μs | 71.91 μs (symbol index 1 = 0) |
|   |   | 71.39 μs (symbol index 1 = 1-6) |
| 30 | 33.35 μs | 35.95 μs (symbol index 1 = 0) |
|   |   | 35.69 μs (symbol index 1 = 1-6) |
| 60 | 16.68 μs | 17.98 μs (symbol index 1 = 0) |
|   |   | 17.85 μs (symbol index 1 = 1-6) |
| 120 | 8.34 μs | 8.99 μs (symbol index 1 = 0) |
|   |   | 8.92 μs (symbol index 1 = 1-6) |

It can be seen that a large subcarrier interval corresponds a short length of the OFDM symbol in time. In addition, in the NR communication system, since one time slot includes 14 OFDM symbols, a large subcarrier interval corresponds to a short absolute length of the time slot. Table 1 only shows cases where the subcarrier interval is 15 kHZ, 30 kHZ, 60 kHZ, and 120 kHZ. In the NR system, the subcarrier interval may also be 240 kHZ and 480 kHZ. Therefore, when the subcarrier interval is large, the absolute length of a time slot is short. If the value of N is small, for example, N=0 or 1, a time for the user equipment to obtain the downlink transmission termination position is very close to that for the downlink transmission termination position, so that the user equipment does not have sufficient time to prepare for uplink feedback or uplink transmission.

Therefore, according to an embodiment of the present disclosure, the configuration unit 110 may be configured to determine a time slot where a GC-PDCCH for carrying a downlink transmission termination position is located according to a length of a OFDM symbol in a MCOT for downlink transmission, so that a short length of the OFDM symbol corresponds to a large value of N. In this way, for different subcarrier configurations, that is, for different lengths of the OFDM symbol, it is necessary to make the advancement amount for transmitting the downlink transmission termination position, that is, the absolute advancement time amount to be consistent, to ensure that the user equipment has sufficient time to prepare for uplink feedback or uplink transmission.

Figure 7:
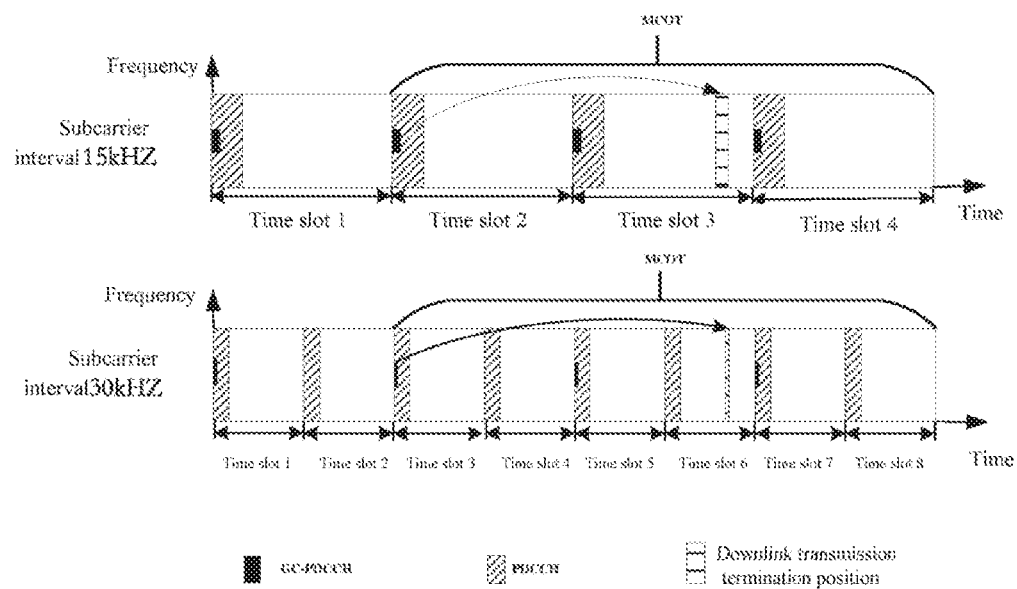
FIG. 7 is a schematic diagram showing a process of determining a time slot where a GC-PDCCH used to transmit a downlink transmission termination position is located according to a length of an Orthogonal Frequency Division Multiplexing (OFDM) symbol according to an embodiment of the present disclosure.

FIG. 7 is a schematic diagram showing a process of determining a time slot where a GC-PDCCH for transmitting a downlink transmission termination position is located according to a length of an OFDM symbol according to an embodiment of the present disclosure. FIG. 7 shows the cases where the subcarrier interval is 15 kHZ and 30 kHZ. As shown in FIG. 7, in a case that the subcarrier interval is 15 kHZ, the information of the downlink transmission termination position is transmitted through the GC-PDCCH in the time slot 2. The downlink transmission termination position is located in the time slot 3, that is, N=1. In the case that the subcarrier interval is 30 kHZ, the information of the downlink transmission termination position is transmitted through the GC-PDCCH in the time slot 3. The downlink transmission termination position is located in a time slot 6, that is, N=3. It can be seen that compared with the case that the subcarrier interval is 15 kHZ, the value of N in the case that the subcarrier interval is 30 kHZ is larger, but the absolute advance time in the two cases is substantially the same.

According to the embodiment of the present disclosure, since the configuration unit 110 may configure GC-PDCCHs in one or more time slots to transmit the information of the downlink transmission termination position, there may also be one or more values of N determined as described above. For example, in the example shown in FIG. 7, in the case that the subcarrier interval is 15 kHZ, assuming that the transmission period of the GC-PDCCH is one time slot, the information of the downlink transmission termination position may also be transmitted through the GC-PDCCH in the time slot 3, where N=0; in the case that the subcarrier interval is 30 kHZ, assuming that the transmission period of the GC-PDCCH is two time slots, the information of the downlink transmission termination position may also be transmitted through the GC-PDCCH in the time slot 5, where N=1.

According to an embodiment of the present disclosure, the configuration unit 110 may be configured to determine a value of N by considering the following parameters: a length of a MCOT for downlink transmission; a transmission period of a GC-PDCCH; and a length of an OFDM symbol in the MCOT for downlink transmission. Further, the configuration unit 110 may also determine the value of N by comprehensively considering multiple of the above parameters. Several non-limiting examples are described below.

For example, the configuration unit 110 may determine the following time slot as a time slot for carrying information of a downlink transmission termination position: a time slot located in the MCOT for downlink transmission and carrying SFI of a time slot where the downlink transmission termination position is located.

For another example, the configuration unit 110 may further select a time slot from time slots located in the MCOT for downlink transmission and carrying the SFI of the time slot where the downlink transmission termination position is located, to determine the value of N according to the length of the OFDM symbol. For a configuration with a subcarrier interval of $15 \times 2^n$ kHZ (n=0, 1, 2, 3, 4, 5), when the $(2^{n+1}-1)$-th time slot before the downlink transmission termination position is located in the MCOT for downlink transmission and carries the SFI of the time slot where the downlink transmission termination position is located, the configuration unit 110 may determine that a value of N is $2^{n+1}-1$. The value of N determined in this case may be a minimum value among all values of N. When the $(2^{n+1}-1)$-th time slot before the downlink transmission termination position is not located in the MCOT for downlink transmission or does not carry the SFI of the time slot where the downlink transmission termination position is located, the configuration unit may determine the following time slots as the time slot for carrying the information of the downlink transmission termination position information: a time slot located farthest from the downlink transmission termination position among time slots located in the MCOT for downlink transmission and carrying the SFI of the time slot where the downlink transmission termination position is located. The value of N determined in this case may be a maximum value among all values of N. For example, in the example shown in FIG. 7, for the case that the subcarrier interval is 15 kHZ, n=0, the $(2^{n+1}-1)$-th time slot before the downlink transmission termination position is the first time slot before the downlink transmission termination position, that is, the time slot 2. As shown in FIG. 7, the time slot 2 is located in the MCOT for downlink transmission. Assuming that the GC-PDCCH in the time slot 2 carries the SFI of the time slot 3, it may be determined that $N=2^{n+1}-1=1$. Assuming that the time slot 1 is also located in the MCOT and carries the SFI of the time slot 3, N may also be two. As another example, in the example shown in FIG. 7, for the case that the subcarrier interval is 30 kHZ, n=1, the ($2^{n+1}-1$)-th time slot before the downlink transmission termination position is the third time slot before the downlink transmission termination position, that is, the time slot 3. As shown in FIG. 7, the time slot 3 is located in the MCOT for downlink transmission. Assuming that the GC-PDCCH in the time slot 3 does not carry the SFI of the time slot 6, and the GC-PDCCH in the time slot 5 carries the SFI of the time slot 6, thus the time slot 5 is the time slot located farthest from the downlink transmission termination position among time slots located in the MCOT for downlink transmission and carrying the SFI of the time slot 6. Therefore, it may be determined that the time slot 5 is the time slot that carries the downlink transmission termination position, that is, N=1. Assuming that the time slot 6 also includes the GC-PDCCH and carries the SFI of the time slot 6, N may also be zero. However, the above examples are merely exemplary, and the present disclosure is not limited thereto.

As described above, according to the embodiment of the present disclosure, the electronic device 100 may carry the information of the downlink transmission termination position for the unlicensed spectrum through the GC-PDCCH. Further, the electronic device 100 may further configure the number and position of the time slot of the GC-PDCCH for carrying the information of the downlink transmission termination position, so as to reasonably design the GC-PDCCH according to the characteristics of the NR communication system.

<2.2 Carrying a Length and a Time Domain Position of a MCOT Through a GC-PDCCH>

According to an embodiment of the present disclosure, the configuration unit 110 may be configured to configure information transmitted through a GC-PDCCH to transmit a length and a time domain position of a MCOT for downlink transmission through the GC-PDCCH. The MCOT includes one or more time slots. Here, the length of the MCOT may be represented by the number of time slots, and the time domain position of the MCOT may include, for example, the sequence numbers of all time slots included in the MCOT.

Figure 8:
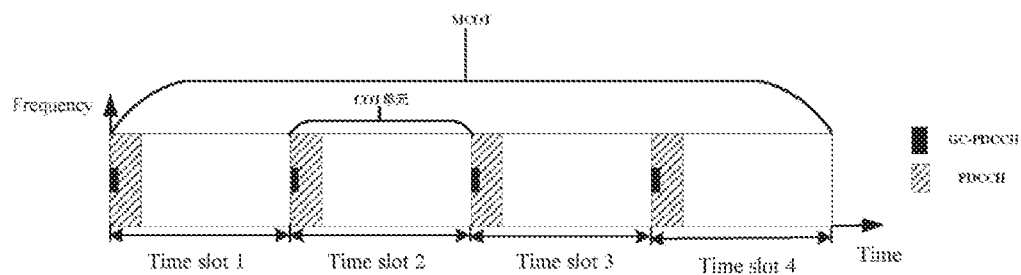
FIG. 8 is a schematic diagram showing a relationship between a MCOT and a Channel Occupy Time (COT) unit according to an embodiment of the present disclosure.

According to an embodiment of the present disclosure, each time slot in the MCOT may be defined as a channel occupy time (COT) unit. That is, the MCOT includes one or more COT units. FIG. 8 is a schematic diagram showing a relationship between a MCOT and a COT unit according to an embodiment of the present disclosure. As shown in FIG. 8, the MCOT includes four time slots: a time slot 1, a time slot 2, a time slot 3, and a time slot 4, and each of the time slots may be a COT unit.

According to an embodiment of the present disclosure, the MCOT includes only one subcarrier configuration, that is, absolute lengths of all time slots included in the MCOT are equal to each other, that is, lengths of all OFDM symbols included in the MCOT are equal to each other. Therefore, for one MCOT, lengths of all COT units are equal to each other.

According to an embodiment of the present disclosure, a first transmission in the COT unit may be a downlink transmission process. That is, transmissions in the COT unit may be all downlink transmissions (the COT unit has no uplink and downlink switching point); or a part of the transmissions in the COT unit may be downlink transmissions, and a following part of the transmissions in the COT unit may be uplink transmissions (the COT unit includes one uplink and downlink switching point); or a part of the transmissions in the COT unit may be downlink transmissions, a following part of the transmissions in the COT unit may be uplink transmissions, and then a following part of the transmissions in the COT unit may be downlink transmissions (the COT unit includes two uplink and downlink switching points). That is, the COT unit includes at least one downlink transmission process. However, this is only an exemplary description, and the first transmission in the COT unit may also be an uplink transmission process.

According to an embodiment of the present disclosure, the electronic device 100 may further be configured to configure SFI of each COT unit in the MCOT, so that the number of switching points between the uplink transmission and the downlink transmission included in each COT unit in the MCOT is not greater than 2. That is, the user equipment is allowed to transmit uplink feedback in the COT unit. Further, after the user equipment performs uplink feedback, the electronic device 100 may further transmit downlink data, thereby improving the channel utilization rate. Further, the electronic device 100 may also configure the SFI of each COT unit in the MCOT, so that the number of switching points between the uplink transmission and the downlink transmission included in the MCOT is not greater than a predetermined threshold. Here, the electronic device 100 may determine the predetermined threshold according to the degree of busyness of the channel. In this way, the electronic device 100 may limit the total number of switching points in the MCOT to avoid frequent uplink and downlink switching.

As described above, the electronic device 100 may carry information of the length and time domain position of the MCOT through the GC-PDCCH, and defines a COT unit, to allow the user equipment to perform uplink transmission in the COT unit. In this way, uplink and downlink configuration is more flexible, thereby improving the channel utilization rate.

<2.3 Carrying Information on Whether to Perform a Channel Detection Process Before Performing Uplink Transmission in a MCOT Through a GC-PDCCH>

According to an embodiment of the present disclosure, the configuration unit 110 may be configured to configure information transmitted through the GC-PDCCH to transmit, through the GC-PDCCH, information on whether to perform a channel detection process before performing uplink transmission in a COT unit of a MCOT.

As described above, the user equipment may perform uplink transmission in the COT unit, for example, transmit uplink feedback, including but not limited to Acknowledgement (ACK)/Negative Acknowledgment (NACK) information. In the LTE system, before performing such an uplink transmission, the user equipment needs to perform a channel detection process, and the uplink transmission may be performed in the COT unit only when the channel is detected as idle.

In the NR communication system, a large subcarrier interval corresponds to a short absolute length of a time slot. When the subcarrier interval is large, the absolute length of a time slot is short. In this case, it may be meaningless for the user equipment to perform a channel detection process before performing uplink transmission. Therefore, according to the embodiment of the present disclosure, the electronic device 100 may configure the user equipment with information on whether to perform a channel detection process before performing uplink transmission in the COT unit of the MCOT. For example, the electronic device 100 may determine whether the user equipment needs to perform a channel detection process before performing uplink transmission according to the subcarrier interval of the system. Specifically, when the subcarrier interval of the system is greater than or equal to a certain threshold, the electronic device 100 may determine that the user equipment does not need to perform a channel detection process before performing uplink transmission; when the subcarrier interval of the system is less than a certain threshold, the electronic device 100 may determine that the user equipment needs to perform a channel detection process before performing uplink transmission. Preferably, the threshold may be 120 kHZ.

Further, the configuration unit 110 of the electronic device 100 may carry, through the GC-PDCCH, information on whether the user equipment needs to perform a channel detection process before performing uplink transmission in the COT unit of the MCOT.

According to an embodiment of the present disclosure, the configuration unit 110 may further configure information transmitted through the PDCCH to transmit, through the PDCCH, information on whether to perform a channel detection process before performing uplink transmission in the COT unit of the MCOT. For example, the configuration unit 110 may carry, through a UE-specific search region of the PDCCH, information on whether the user equipment needs to perform a channel detection process before performing uplink transmission in the COT unit. Further, the communication unit 120 may retransmit, through the PDCCH, information on whether the user equipment needs to perform a channel detection process before performing uplink transmission in the COT unit.

As described above, according to the embodiment of the present disclosure, information on whether the user equipment needs to perform a channel detection process before performing uplink transmission in the COT unit may be transmitted through both the GC-PDCCH and the PDCCH, to prevent the user equipment from not receiving information on the GC-PDCCH or from incorrectly demodulating the information on the GC-PDCCH.

According to an embodiment of the present disclosure, the channel detection process may be a Listen Before Talk (LBT) process. For example, the channel detection process may be a Type 2 channel detection process, that is, a channel detection process that does not include a random backoff process.

As described above, according to an embodiment of the present disclosure, the electronic device 100 may configure the user equipment with information on whether to perform a channel detection process before performing uplink transmission in the COT unit, so that the channel detection process is not performed in some cases, thereby saving the signaling overhead.

<2.4 Carrying Parameter Information of a Channel Detection Process Through a GC-PDCCH>

According to an embodiment of the present disclosure, the configuration unit 110 may be configured to configure information transmitted through the GC-PDCCH to transmit, through the GC-PDCCH, parameter information of a channel detection process performed before performing uplink transmission in a COT of a MCOT.

According to an embodiment of the present disclosure, when the electronic device 100 does not transmit, through the GC-PDCCH, to the user equipment the information on whether to perform a channel detection process before performing uplink transmission in the COT unit, it may be defaulted that the user equipment needs to perform the channel detection process before each uplink transmission, so that the parameter regarding the channel detection process performed before performing uplink transmission in the COT of the MCOT may be directed to all channel detection processes. When the electronic device 100 transmits, through the GC-PDCCH, to the user equipment the information on that the channel detection process need to be performed before performing uplink transmission in the COT unit, the parameter regarding the channel detection process performed before performing uplink transmission in the COT of the MCOT may be directed to the channel detection process to be performed.

According to an embodiment of the present disclosure, the parameter of the channel detection process includes, but is not limited to, information of a starting time of the channel detection process, such as a position of an OFDM symbol where the starting time is located. However, the parameter of the channel detection process may also include other related parameters for performing the channel detection process.

As described above, according to an embodiment of the present disclosure, the electronic device 100 may carry a parameter related to a channel detection process through a GC-PDCCH. Compared with a case that a public search region of the PDCCH is directed to user equipments in the entire cell, the GC-PDCCH is directed to a group of user equipments, thereby reducing the range of the users to a certain extent. Compared with a case that a UE-specific search region of the PDCCH is directed to a specific user equipment, similar information can be transmitted to a group of user equipments, thereby saving the signaling overhead.

<2.5 Carrying Control Information Related to Data in a Previous Time Slot Through a GC-PDCCH>

According to an embodiment of the present disclosure, the configuration unit 110 may be configured to configure information transmitted through the GC-PDCCH to transmit, through the GC-PDCCH, control information related to data in a previous time slot of a time slot where the GC-PDCCH is located.

Figure 9:
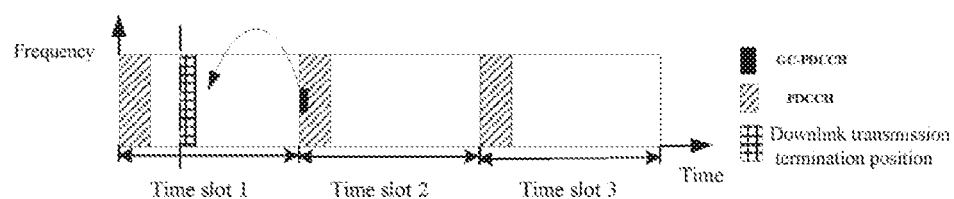
FIG. 9 is a schematic diagram showing a process of transmitting control information related to data in a previous time slot through a GC-PDCCH according to an embodiment of the present disclosure.

FIG. 9 is a schematic diagram showing a process of transmitting control information related to data in a previous time slot through a GC-PDCCH according to an embodiment of the present disclosure. In FIG. 9, the horizontal axis indicates a time, and the vertical axis indicates a frequency. FIG. 9 shows a situation of three time slots (a time slot 1, a time slot 2 and a time slot 3). The oblique shaded region indicates a region occupied by a PDCCH, for example, the first three OFDM symbols in each time slot, and the black solid region indicates a region occupied by the GC-PDCCH. The grid region indicates a downlink transmission starting position for an unlicensed spectrum. As shown in FIG. 9, for various reasons, since the PDCCH is not transmitted in the time slot 1, the user equipment cannot decode data in the time slot 1. According to the embodiment of the present disclosure, control information related to the data in the time slot 1 can be transmitted through the GC-PDCCH in the time slot 2, so that the data in the time slot 1 is not wasted. It is to be noted that although not shown in FIG. 9, the GC-PDCCH in the time slot 2 may be used to carry other information according to any of the above embodiments, such as information of the downlink transmission termination position, information of SFIs of the time slot 2 and later time slots.

According to an embodiment of the present disclosure, when the control information related to the data in the previous time slot is not transmitted in the previous time slot, the electronic device 100 may transmit the control information related to the data in the previous time slot through the GC-PDCCH. Here, the previous time slot may be a time slot where the GC-PDCCH is transmitted, or may be a time slot where the GC-PDCCH is not transmitted.

According to an embodiment of the present disclosure, the reason that the control information related to the data in the previous time slot is not transmitted in the previous time slot may be that the channel detection of the electronic device 100 is successful after the region of the PDCCH in the previous time slot. As shown in FIG. 9, the electronic device 100 detects that the channel is idle after the region of the PDCCH in the time slot 1, but the transmission time of the PDCCH has been missed, failing to transmit the control information related to the data in the time slot 1. It is to be noted that, FIG. 9 shows a case that the region of the PDCCH in the time slot 1 does not include the GC-PDCCH. However, the PDCCH in the time slot 1 may also include the GC-PDCCH, and the GC-PDCCH is also not transmitted in this case.

According to an embodiment of the present disclosure, assuming that a downlink transmission starting position for an unlicensed spectrum is located behind a region of a PDCCH in a time slot, and no control information related to data in the time slot is transmitted in the time slot. In this case, since the user equipment does not know the control information related to the data in the time slot, the user equipment cannot decode the data, thereby resulting in a waste of resources. According to the embodiment of the present disclosure, the control information related to the data in the previous time slot can be carried through a GC-PDCCH in a next time slot, so that the user equipment can decode the data, thereby improving the channel utilization rate.

According to an embodiment of the present disclosure, the data in the previous time slot may be a part of data for downlink transmission, that is, the time slot where the GC-PDCCH is located will be continually used to transmit downlink data that has not been transmitted in the previous time slot, that is, the data in the previous time slot and the data in the time slot where the GC-PDCCH is located belong to the same data packet. Further, the data in the previous time slot may also include all data for downlink transmission. That is, the data in the previous time slot includes a complete data packet.

According to an embodiment of the present disclosure, the control information related to the data in the previous time slot may be used to decode the data in the previous time slot, that is, the control information related to the data in the previous time slot may be information for decoding the data in the previous time slot. For example, the control information may indicate a Modulation and Coding Scheme (MCS) level of the data in the previous time slot. Specifically, the control information may include an index of the MCS level of the data in the previous time slot. That is, the electronic device 100 and the user equipment both store a correspondence relationship between the MCS level and the index. The user equipment may determine the MCS level when acquiring the index of the MCS level, thereby decoding the data. Further, the control information may also indicate the SFI of the data in the previous time slot, so that the user equipment can determine the uplink and downlink configuration information of the previous time slot, thereby decoding the data.

According to the embodiment of the present disclosure, assuming that the previous time slot is a time slot where the GC-PDCCH is transmitted, since control information is not transmitted in the previous time slot, the GC-PDCCH in the previous time slot is also not transmitted. Therefore, the user equipment is likely to be unknown of the SFI of the previous time slot. Therefore, the electronic device 100 may transmit data in a previous time slot of the time slot where the GC-PDCCH is located according to default time slot format related information SFI. For example, the electronic device 100 may transmit the data in the previous time slot according to SFI determined in advance between the electronic device 100 and the user equipment, so that the user equipment may receive the data in the previous time slot according to the previously determined SFI. Further, the electronic device 100 may also transmit the data in the previous time slot according to the SFI of the previous time slot set by the electronic device 100 (that is, adopting the same SFI as that in a case that the GC-PDCCH is transmitted in the previous time slot), so that the user equipment can default that all the OFDM symbols in this time slot are used for downlink transmission, thereby receiving the data of the previous time slot on all the OFDM symbols.

According to an embodiment of the present disclosure, the GC-PDCCH may carry the SFI of the previous time slot. That is, the GC-PDCCH in one time slot may carry information of one or more of the following: SFI of a current time slot; SFI of a subsequent time slot of the current time slot; and SFI of a previous time slot of the current time slot. Further, the GC-PDCCH in one time slot may carry SFIs of one or more time slots.

According to an embodiment of the present disclosure, the communication unit 120 may be further configured to transmit a notification to the user equipment so that the user equipment receives control information related to data in a previous time slot through a GC-PDCCH.

According to the embodiment of the present disclosure, assuming that the current time slot is not the time slot for transmitting the GC-PDCCH, since the GC-PDCCH has a certain period, the electronic device needs to carry the control information related to the data of the previous time slot through the GC-PDCCH in the current time slot, while the user equipment receives the GC-PDCCH according to the original receiving period of the GC-PDCCH, thus the user equipment will not receive the GC-PDCCH in the current time slot. In this case, the electronic device 100 may transmit a notification to the user equipment to notify the user equipment to receive the GC-PDCCH of the current time slot to obtain the control information related to the data in the previous time slot. Taking FIG. 9 as an example, when the electronic device 100 determines that the downlink data starting position has missed the region of the PDCCH in the time slot 1, the electronic device 100 may transmit a notification to the user equipment to notify the user equipment to receive the GC-PDCCH on the time slot 2.

According to an embodiment of the present disclosure, the electronic device 100 may transmit the above notification to the user equipment by using a licensed spectrum. Further, the electronic device 100 may transmit such a notification to the user equipment by using the licensed spectrum through high-level signaling (including but not limited to RRC signaling) or low-level signaling (including but not limited to physical layer signaling).

According to an embodiment of the present disclosure, the electronic device 100 may be further configured to configure a transmission period of a GC-PDCCH, and may transmit the configured transmission period of the GC-PDCCH to the user equipment. In addition, the electronic device 100 may also reconfigure the transmission period of the GC-PDCCH, and may transmit the reconfigured transmission period of the GC-PDCCH to the user equipment.

According to an embodiment of the present disclosure, the electronic device 100 may transmit a transmission period of a GC-PDCCH or a reconfigured transmission period of the GC-PDCCH to a user equipment through a licensed spectrum. Further, the electronic device 100 may transmit the transmission period of the GC-PDCCH or the reconfigured transmission period of the GC-PDCCH to the user equipment through the licensed spectrum by using high-level signaling (including but not limited to RRC signaling) or low-level signaling (including but not limited to physical layer signaling).

As described above, according to an embodiment of the present disclosure, the control information related to the data in the previous time slot may be transmitted through the GC-PDCCH in the current time slot, so that the user equipment may correctly decode the data in the previous time slot, thereby improving the channel utilization rate.

In addition, the control information related to a part of data in the current time slot may be carried through an ePDCCH. The ePDCCH may carry the control information by using resources of a Physical Downlink Share Channel (PDSCH). Therefore, even if the PDCCH is not transmitted, the control information can be carried through the ePDCCH inserted in the data, and the user can demodulate the data by demodulating the control information.

<2.6 Transmitting a GC-PDCCH in an Immediately Following Time Slot in a Case that the GC-PDCCH is not Transmitted in a Previous Time Slot>

According to an embodiment of the present disclosure, the configuration unit 110 may be configured to configure data transmitted through the GC-PDCCH, so that if the GC-PDCCH is not successfully transmitted in the previous time slot, the GC-PDCCH is transmitted in the immediately following time slot.

According to an embodiment of the present disclosure, as described above, the GC-PDCCH transmitted in the immediately following time slot may carry control information related to data in the previous time slot.

According to the embodiment of the present disclosure, according to the setting of transmission period of the GC-PDCCH, assuming that the previous time slot is a time slot where the GC-PDCCH should be transmitted, the immediately following time slot may be a time slot where the GC-PDCCH should be transmitted, and the immediately following time slot may also be a time slot where the GC-PDCCH should not be transmitted. According to an embodiment of the present disclosure, in a case that the GC-PDCCH is not successfully transmitted in the previous time slot, the electronic device 100 transmits the GC-PDCCH in the immediately time slot regardless of the transmission period of the GC-PDCCH.

Figure 10:
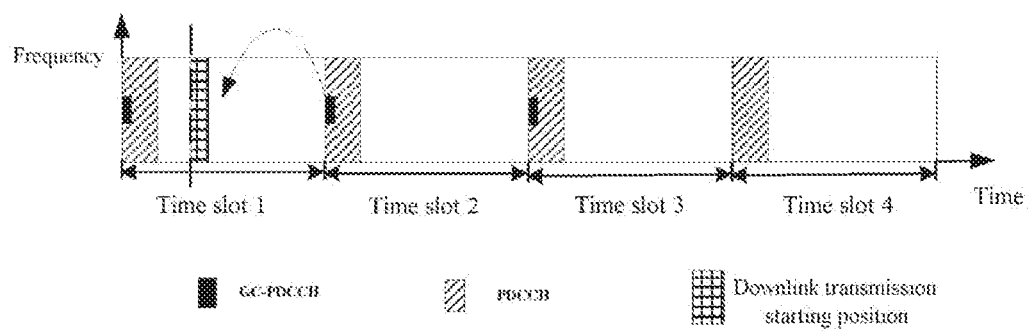
FIG. 10 is a schematic diagram showing a process of transmitting control information related to data in a previous time slot in a next time slot regardless of a transmission period of a GC-PDCCH in a case that the control information is not transmitted in the previous time slot according to an embodiment of the present disclosure.

FIG. 10 is a schematic diagram showing a process of transmitting control information related to data in a previous time slot in a next time slot in a case that the control information is not transmitted in the previous time slot, regardless of a transmission period of a GC-PDCCH. As shown in FIG. 10, the horizontal axis indicates a time, and the vertical axis indicates a frequency. FIG. 10 shows a situation of four time slots (a time slot 1, a time slot 2, a time slot 3, and a time slot 4). The oblique shaded region indicates a region occupied by a PDCCH, for example, the first three OFDM symbols in each time slot, and the black solid region indicates a region occupied by a GC-PDCCH. The grid region indicates a downlink transmission starting position for an unlicensed spectrum. In FIG. 10, the transmission period of the GC-PDCCH is two time slots, that is, the GC-PDCCH should be transmitted in the time slots 1 and 3. As shown in FIG. 10, for various reasons, for example, the channel detection is unsuccessful as described above, the region of the PDCCH in the time slot 1 is not transmitted, that is, the GC-PDCCH in the time slot 1 is not transmitted successfully, then the electronic device 100 may transmit the GC-PDCCH in the time slot 2. Here, since the time slot 2 is not a time slot where the GC-PDCCH should be transmitted, the electronic device 100 may use the time slot 2 to transmit control information related to the data in the time slot 1.

As described above, according to an embodiment of the present disclosure, in a case that the GC-PDCCH in the previous time slot is not successfully transmitted, the electronic device 100 may transmit the GC-PDCCH in the immediately following time slot. In this way, since the electronic device 100 has occupied the channel in the immediately following time slot, the probability of transmitting the GC-PDCCH in the immediately following time slot to be correctly received and decoded by the user equipment is greatly increased.

According to an embodiment of the present disclosure, since the time slot 2 is not a time slot where the GC-PDCCH should be transmitted, the electronic device 100 may transmit a notification to the user equipment so that the user equipment receives control information related to data in the previous time slot through the GC-PDCCH. Further, the electronic device 100 may transmit the notification to the user equipment by using a licensed spectrum. According to an embodiment of the present disclosure, the electronic device 100 may not transmit a notification to the user equipment, so that when the user equipment automatically receives the GC-PDCCH in the time slot 2 when not receiving the GC-PDCCH in the time slot 1.

According to an embodiment of the present disclosure, the electronic device 100 may also change the transmission period of the GC-PDCCH, and may reconfigure the transmission period of the GC-PDCCH to the user equipment. For example, the electronic device 100 may transmit the reconfigured transmission period of the GC-PDCCH to the user equipment through the licensed spectrum.

As described above, according to an embodiment of the present disclosure, when the electronic device 100 does not transmit the GC-PDCCH successfully in the previous time slot, the electronic device 100 may use the immediately following time slot to transmit the GC-PDCCH, regardless the transmission period of the GC-PDCCH, so that the user equipment can successfully demodulate the data in the previous time slot, thereby improving the channel utilization rate.

It can be seen that, the electronic device 100 according to the embodiment of the present disclosure may transmit, through the GC-PDCCH, one or more of the following information: information of a downlink transmission termination position for an unlicensed spectrum; information of a length and a domain position of a MCOT for downlink transmission; information on whether to perform a channel detection process before performing uplink transmission in the COT unit; parameter information of the channel detection process; and control information related to data in a previous time slot before a time slot where a GC-PDCCH is located. According to an embodiment of the present disclosure, the electronic device 100 may transmit any one of the above information individually, or may transmit the information in a combination manner. Compared with a case that a public search region of the PDCCH is directed to user equipments in the entire cell, the GC-PDCCH is directed to a group of user equipments, thereby reducing the range of the users to a certain extent. Compared with a case that a UE-specific search region of the PDCCH is directed to a specific user equipment, similar information can be transmitted to a group of user equipments, thereby saving the signaling overhead. It can be seen that, in the present disclosure, the GC-PDCCH is designed more reasonably according to the characteristics of the NR communication system.

<2.7 Carrying a Downlink Transmission Starting Position>

According to an embodiment of the present disclosure, the configuration unit 110 may configure information of a downlink transmission starting position for an unlicensed spectrum, and the communication unit 120 may transmit the information of the downlink transmission starting position for the unlicensed spectrum.

According to an embodiment of the present disclosure, information of the downlink transmission starting position for the unlicensed spectrum may be carried through high-level signaling, including but not limited to RRC signaling.

According to an embodiment of the present disclosure, the information of the downlink transmission starting position for the unlicensed spectrum may include one or more of the following: indication information of a subframe corresponding to the downlink transmission starting position, indication information of a time slot corresponding to the downlink transmission starting position, and indication information of an OFDM symbol corresponding to the downlink transmission starting position.

According to an embodiment of the present disclosure, a downlink transmission starting position for an unlicensed spectrum may include a possible downlink transmission starting position for the unlicensed spectrum, and thus information of the downlink transmission starting position for the unlicensed spectrum may include one or more starting positions.

According to an embodiment of the present disclosure, the configuration unit 110 may be configured to configure information of a downlink transmission starting position for an unlicensed spectrum according to a length of an OFDM symbol (or a size of a subcarrier interval) included in the MCOT for downlink transmission. Specifically, for a small length of the OFDM symbol included in the MCOT, that is, a large subcarrier interval, more downlink transmission starting positions for the unlicensed spectrum can be configured. That is, a small length of the OFDM symbol included in the MCOT corresponds to a large number of time slots included in one subframe, therefore, more downlink transmission starting positions can be selected.

According to an embodiment of the present disclosure, the information of the downlink transmission starting position for the unlicensed spectrum may include indication information of the OFDM symbol corresponding to the downlink transmission starting position. Specifically, the indication information may include an index of the OFDM symbol within a subframe. For example, the OFDM symbols in one subframe can be sorted and numbered in an order in the time domain, so as to determine an index of each OFDM symbol. Further, after determining one or more downlink transmission starting positions, the configuration unit 110 may configure an index of the OFDM symbol corresponding to the one or more starting positions as information of the downlink transmission starting position for the unlicensed spectrum, and the communication unit 120 may transmit such information.

According to an embodiment of the present disclosure, a downlink transmission starting position for an unlicensed spectrum may be located at a starting position and an intermediate position in a time slot. That is, for a time slot including 14 OFDM symbols (numbered as #0, #1, . . . , #13 respectively), the downlink transmission starting position for the unlicensed spectrum may be located at OFDM symbols numbers as #0 and #7, which can simplify the design of signaling and save overhead. In this case, for the above embodiment, for a configuration with a subcarrier of $15 \times n$ (kHZ) (n=1, 2, 4, 8, 16, 32), each subframe includes n time slots, each time slot includes 2 OFDM symbols that can be used as the downlink transmission starting position for the unlicensed spectrum, such that each subframe includes 2n OFDM symbols that can be used as the downlink transmission starting position for the unlicensed spectrum. For a case of n=32, each subframe includes 64 OFDM symbols that can be used as the downlink transmission starting position for the unlicensed spectrum, thus 6 bits of information are needed at a maximum to indicate the index of the OFDM symbol in the subframe.

According to an embodiment of the present disclosure, the information of the downlink transmission starting position for the unlicensed spectrum may include the indication information of the time slot corresponding to the downlink transmission starting position and the indication information of the OFDM symbol corresponding to the downlink transmission starting position. Specifically, the indication information may include an index of a time slot in a subframe and an index of the OFDM symbol in the time slot. For example, time slots in one subframe may be sorted and numbered in an order in the time domain, so as to determine an index of each time slot in the subframe. In addition, the OFDM symbols in a time slot can be sorted and numbered in the order in the time domain to determine the index of each OFDM in the time slot. Further, after determining one or more downlink transmission starting positions, the configuration unit 110 may configure the index of the time slot corresponding to each of the one or more starting positions in the subframe and the index of the OFDM symbol corresponding to the starting position in the time slot as information of the downlink transmission starting position for the unlicensed spectrum, and transmit such information through the communication unit 120.

For a configuration with a subcarrier of $15 \times n$ (kHZ) (n=1, 2, 4, 8, 16, 32), each subframe includes n time slots. When n=32, each sub-frame includes 32 time slots, thus 5 bits are needed to indicate an index of a time slot in the sub-frame. Similarly, for a case that the downlink transmission starting position may be located in OFDM symbols numbered as #0 and #7 in one time slot, each time slot includes two OFDM symbols that may be used as the downlink transmission starting position for the unlicensed spectrum, thus 1 bit is needed to indicate an index of a OFDM symbol in the time slot. That is, a total of 6 bits are needed to indicate the index of the time slot corresponding to the starting position in the subframe and the index of the OFDM symbol corresponding to the starting position in the time slot corresponding to the starting position.

According to an embodiment of the present disclosure, a downlink transmission starting position for an unlicensed spectrum may include one or more of the following positions: a boundary position of a subframe; a boundary position of a time slot; and a middle position of the time slot.

Here, the boundary position of a subframe refers to a starting position of each subframe. The boundary position of a time slot refers to a starting position of each time slot. When a time slot is the first time slot in a subframe, the boundary position of the time slot is also the boundary position of the subframe. The middle position of the time slot refers to a midpoint of the time slot in the time domain. For a time slot including 14 OFDM symbols (numbered as #0, #1, . . . , #13, respectively), the middle position of the time slot refers to the OFDM symbol numbered as #7.

According to an embodiment of the present disclosure, the information of the downlink transmission starting position for the unlicensed spectrum may include information on a type of a starting position, for indicating the downlink transmission starting position is which one or more of the following positions: a boundary position of a subframe; a boundary position of a time slot; and a middle position of the time slot. Exemplarily, such type information may be represented by a type index.

The following exemplarily shows a combination of the above types of information: the boundary position of the subframe; the boundary position of the time slot; the boundary position of the subframe or the boundary position of the time slot; the boundary position of the time slot or the middle position of the time slot; and the boundary position of the subframe or the boundary position of the time slot or the middle position of the time slot. For example, the electronic device 100 may use 3 bits of information to indicate the index of the above combinations, as shown in Table 2.

TABLE 2

| Index | Type of a downlink transmission starting position |
|---|---|
| 000 | Boundary position of a subframe |
| 001 | Boundary position of a time slot |
| 010 | Boundary position of the subframe or boundary position of the time slot |
| 011 | Boundary position of the time slot or middle position of the time slot |
| 100 | Boundary position of the subframe or boundary position of the time slot or middle position of the time slot |

According to an embodiment of the present disclosure, since the downlink transmission starting position may be located at the boundary position of the subframe; the boundary position of the time slot; the boundary position of the subframe or the boundary position of the time slot; the boundary position of the time slot or the middle position of the time slot; or the boundary position of the subframe, the boundary position of the time slot or the middle position of the time slot, thus the electronic device 100 may schedule downlink transmission in the unit of subframe, and may also perform downlink transmission in the unit of time slot, and may also schedule downlink transmission in the unit a half of a length of the time slot, so that there are more opportunities for downlink transmission in the unlicensed frequency band, which improves the utilization efficiency of the unlicensed spectrum.

As described above, the configuration of the information of the downlink transmission is described in the present disclosure by several non-limiting examples. However, the information of the downlink transmission starting position for the unlicensed spectrum may also be configured in other ways, as long as the information can indicate the downlink transmission starting position for the unlicensed spectrum.

As described above, the electronic device 100 according to the embodiment of the present disclosure may carry the downlink transmission starting position for the unlicensed spectrum through, for example, high-level signaling. In this way, compared with the LTE Licensed Assisted Access (LTE LAA) system, there are more opportunities for downlink transmission in the unlicensed frequency band in the NR communication system, which improves the utilization rate of the unlicensed spectrum.

3. Configuration Example of a User Equipment

Figure 11:
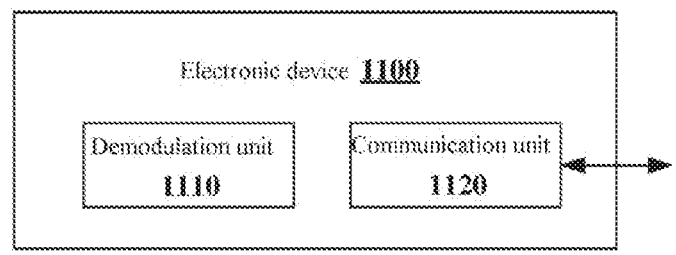
FIG. 11 is a block diagram showing an example of a configuration of an electronic device according to another embodiment of the present disclosure.

FIG. 11 is a block diagram showing a structure of an electronic device 1100 serving as a user equipment in a wireless communication system according to an embodiment of the present disclosure. The electronic device 1100 herein may be used as a user equipment in an NR communication system.

As shown in FIG. 11, the electronic device 1100 may include a demodulation unit 1110 and a communication unit 1120.

Here, each unit of the electronic device 1100 may be included in a processing circuit. It should be noted that the electronic device 1100 may include one processing circuit or multiple processing circuits. Further, the processing circuit may include various discrete functional units to perform various different functions and/or operations. It should be noted that these functional units may be physical entities or logical entities, and units with different names may be implemented by the same physical entity.

According to an embodiment of the present disclosure, the communication unit 1120 may receive downlink information, including downlink information transmitted through the GC-PDCCH and the PDCCH, from a network side device serving the electronic device 1100. Further, the demodulation unit 1110 may demodulate the downlink information.

According to an embodiment of the present disclosure, the electronic device 1100 may receive information transmitted through the GC-PDCCH by using an unlicensed spectrum. Further, the electronic device 1100 may also receive the information transmitted through the GC-PDCCH by using a licensed spectrum. In this way, the electronic device 1100 can ensure the reliability of receiving the information carried on the GC-PDCCH.

<3.1 Receiving a Downlink Transmission Termination Position Through a GC-PDCCH>

According to an embodiment of the present disclosure, the communication unit 1120 may receive information through a GC-PDCCH. Further, the demodulation unit 1110 may demodulate the information received through the GC-PDCCH to obtain a downlink transmission termination position for an unlicensed spectrum.

According to an embodiment of the present disclosure, the demodulation unit 1110 may also demodulate the information received through the GC-PDCCH to obtain time slot format related information SFI of a time slot where the downlink transmission termination position is located. As described above, the network side device carries the information of the downlink transmission termination position and the SFI of the time slot where the downlink transmission termination position is located through the GC-PDCCH in the same time slot. Therefore, the demodulation unit 1110 may demodulate the information received through the GC-PDCCH in the same time slot to obtain the downlink transmission termination position and the SFI of the time slot where the downlink transmission termination position is located.

According to an embodiment of the present disclosure, the communication unit 1120 may further receive information through a PDCCH. Further, the demodulation unit 1110 may demodulate the information received through the PDCCH to obtain a downlink transmission termination position for the unlicensed spectrum. As described above, the network side device may transmit the information of the downlink transmission termination position for the unlicensed spectrum through both the GC-PDCCH and the PDCCH. Therefore, the demodulation unit 1110 may demodulate a public search region or a UE-specific search region of the PDCCH to obtain a downlink transmission termination position for the unlicensed spectrum.

According to an embodiment of the present disclosure, the demodulation unit 1110 may demodulate information received through the GC-PDCCH to obtain a downlink transmission termination position for an unlicensed spectrum, or may demodulate information received through the PDCCH to obtain a downlink transmission termination position for an unlicensed spectrum. When there is a conflict, that is, the downlink transmission termination position obtained by demodulating the information received through the GC-PDCCH is different from the downlink transmission termination position obtained by demodulating the information received through the PDCCH, the demodulation unit 1110 may cause the downlink transmission termination position for the unlicensed spectrum obtained by demodulating the information received through the PDCCH to be prevailed, that is, take the downlink transmission termination position for the unlicensed spectrum obtained by demodulating the information received through the PDCCH as the downlink transmission termination position.

As described above, the electronic device 1100 according to the embodiment of the present disclosure may obtain the downlink transmission termination position through both the GC-PDCCH and the PDCCH. In this way, the user equipment can be prevented from not receiving the GC-PDCCH or from incorrectly decoding the information carried on the GC-PDCCH.

Figure 12:
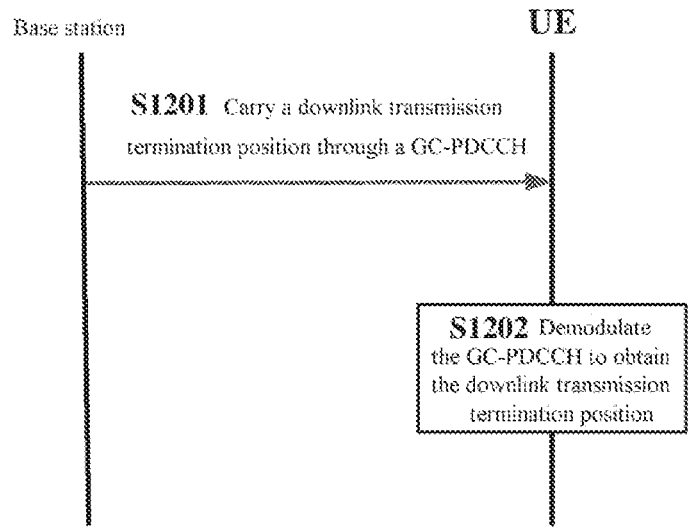
FIG. 12 is a signaling interaction diagram showing a process of transmitting a downlink transmission termination position through a GC-PDCCH according to an embodiment of the present disclosure.

FIG. 12 is a signaling interaction diagram showing a process of transmitting a downlink transmission termination position through a GC-PDCCH according to an embodiment of the present disclosure. As shown in FIG. 12, in step S1201, a base station carries a downlink transmission termination position for an unlicensed spectrum through a GC-PDCCH. Next, in step S1202, a user equipment (UE) obtains the downlink transmission termination position for the unlicensed spectrum by demodulating the GC-PDCCH.

As described above, the electronic device 1100 may obtain the downlink transmission termination position for the unlicensed spectrum through the GC-PDCCH. In this way, for information of a public search region of the PDCCH, the electronic device 1100 needs to perform blind detection at two aggregation levels, while the GC-PDCCH only contains a search space of one aggregation level, thus reducing the workload for blind detection of the electronic device 1100. Further, compared with a case of carrying the above information through the UE-specific search region of the PDCCH, the above information is carried through the GC-PDCCH, such that the electronic device 1100 can obtain the downlink transmission termination position earlier, thereby preparing for uplink feedback or uplink data transmission.

<3.2 Receiving a Length and a Time Domain Position of a MCOT Through a GC-PDCCH>

According to an embodiment of the present disclosure, the demodulation unit 1110 may also demodulate the information received through the GC-PDCCH to obtain a length and a time domain position of a max channel occupy time MCOT for downlink transmission, where the MCOT includes one or more time slots.

As described above, each time slot in the MCOT may be defined as a COT unit. That is, the MCOT includes one or more COT units. Here, the length of the MCOT may be expressed, for example, by the number of time slots or COT units, and the time domain position of the MCOT may include, for example, all time slots included in the MCOT or the time slot numbers of the COT units.

In the LTE communication system, the length and time domain position of the MCOT are only known by the network side device, while the user equipment does not know the length and time domain position of the MCOT, thus the user equipment may not have time to perform uplink feedback. According to the embodiment of the present disclosure, the electronic device 1100 may obtain the length and time domain position of the MCOT through the GC-PDCCH, thereby preparing for uplink feedback.

According to an embodiment of the present disclosure, the number of switching points between uplink transmission and downlink transmission included in each COT unit in the MCOT is not greater than two. That is, the electronic device 1100 may perform uplink transmission in the COT unit, such as transmitting uplink feedback information. Further, after the electronic device 1100 performs uplink feedback, the network side device may further transmit downlink data, thereby improving the channel utilization rate. Further, the number of switching points between the uplink transmission and the downlink transmission included in the MCOT may not be greater than a predetermined threshold, thereby avoiding frequent uplink and downlink switching.

As described above, according to an embodiment of the present disclosure, a COT unit within the MCOT is determined for the NR communication system, and each COT unit is similar to the MCOT in the LTE communication system. In other words, the electronic device 1100 is allowed to perform uplink data feedback in each COT unit. In addition, after the electronic device 1100 performs uplink data feedback, the network side device is allowed to continually transmit downlink data. In this way, the configuration of the NR communication system is more flexible.

<3.3 Receiving, Through the GC-PDCCH, Information on Whether to Perform a Channel Detection Process Before Performing Uplink Transmission in MCOT>

According to an embodiment of the present disclosure, the demodulation unit 1110 may demodulate information received through the GC-PDCCH to determine whether to perform a channel detection process before performing uplink transmission in a COT unit of the MCOT.

According to an embodiment of the present disclosure, when the information obtained by demodulation of the demodulation unit 1110 indicates that the channel detection process needs to be performed before performing uplink transmission in the COT unit of the MCOT, the electronic device 1100 needs to perform the channel detection process. The uplink transmission is performed in the COT unit only when a channel is detected as idle. Further, when the information obtained by demodulation of the demodulation unit 1110 indicates that it is unnecessary to perform the channel detection process before performing uplink transmission in the COT unit of the MCOT, the electronic device 1100 does not need to perform the channel detection process, and can directly perform uplink transmission in the COT unit of the MCOT.

According to an embodiment of the present disclosure, uplink transmission may include uplink feedback on downlink data from a network side device, such as ACK/NACK. In addition, the channel detection process may also be an LBT process, such as a Type 2 channel detection process.

According to an embodiment of the present disclosure, the communication unit 1120 may also receive information through a PDCCH. Further, the demodulation unit 1110 may demodulate the information received through the PDCCH to determine whether to perform a channel detection process before performing uplink transmission in the COT unit of the MCOT.

According to an embodiment of the present disclosure, the demodulation unit 1110 may demodulate the information received through the GC-PDCCH to determine whether to perform a channel detection process before performing uplink transmission in the COT unit of the MCOT, and may also demodulate the information received through the PDCCH to determine whether to perform the channel detection process before performing uplink transmission in the COT unit of the MCOT. Further, when there is a conflict, that is, it is determined that a channel detection process needs to be performed before performing uplink transmission in the COT unit of the MCOT determined by demodulating the information received through the GC-PDCCH and it is determined that it is unnecessary to perform the channel detection process before performing uplink transmission in the COT unit of the MCOT by demodulating the information received through the PDCCH, or it is determined that it is unnecessary to perform a channel detection process before performing uplink transmission in the COT unit of the MCOT by demodulating the information received through the GC-PDCCH and it is determined that the channel detection process needs to be performed before performing uplink transmission in the COT unit of the MCOT by demodulating the information received through the PDCCH, the demodulation unit may cause the determination result on whether to perform the channel detection process before performing uplink transmission in the COT unit of the MCOT determined by demodulating the information received through the PDCCH to be prevailed.

As described above, according to an embodiment of the present disclosure, the electronic device 1100 may receive information on whether the electronic device 1100 needs to perform the channel detection process before performing uplink transmission in the COT unit through both the GC-PDCCH and the PDCCH, to prevent the electronic device 1100 from not receiving the information on the GC-PDCCH or incorrectly demodulating the information on the GC-PDCCH. Further, the network side device may configure information on whether the electronic device 1100 needs to perform a channel detection process before performing uplink transmission in the COT unit. That is, in some cases, the electronic device 1100 may directly perform uplink transmission in the COT unit without performing a channel detection process, thereby saving signaling overhead.

<3.4 Receiving Parameter Information of a Channel Detection Process Through a GC-PDCCH>

According to an embodiment of the present disclosure, the demodulation unit 1100 may demodulate information received through the GC-PDCCH to obtain parameters of a channel detection process performed before performing uplink transmission in a COT unit of the MCOT.

According to an embodiment of the present disclosure, when the electronic device 1100 does not receive information on whether to perform a channel detection process before performing uplink transmission in the COT unit from the network side device, it may be defaulted that the electronic device 1100 needs to perform the channel detection process before each uplink transmission, thus the parameter of the channel detection process performed before performing uplink transmission in the COT of the MCOT may be directed to all channel detection processes. When the electronic device 1100 receives from the network side device information on that the channel detection process needs to be performed before performing uplink transmission in the COT unit, the parameter of the channel detection process that is performed before performing uplink transmission in the COT unit may be directed to the channel detection process to be performed.

According to an embodiment of the present disclosure, the parameter of the channel detection process includes, but is not limited to, information of a starting time of the channel detection process, such as a position of an OFDM symbol where the starting time is located. However, the parameter of the channel detection process may also include other related parameters for performing the channel detection process.

As described above, according to an embodiment of the present disclosure, the electronic device 1100 may acquire a parameter related to a channel detection process through a GC-PDCCH. The GC-PDCCH only contains a search space of an aggregation level, thus reducing the workload for blind detection of the user equipment. Further, the above information is carried by the GC-PDCCH, so that the electronic device 1100 can obtain the parameter related to the channel detection process earlier, thereby preparing for uplink feedback or uplink data transmission.

Figure 13:
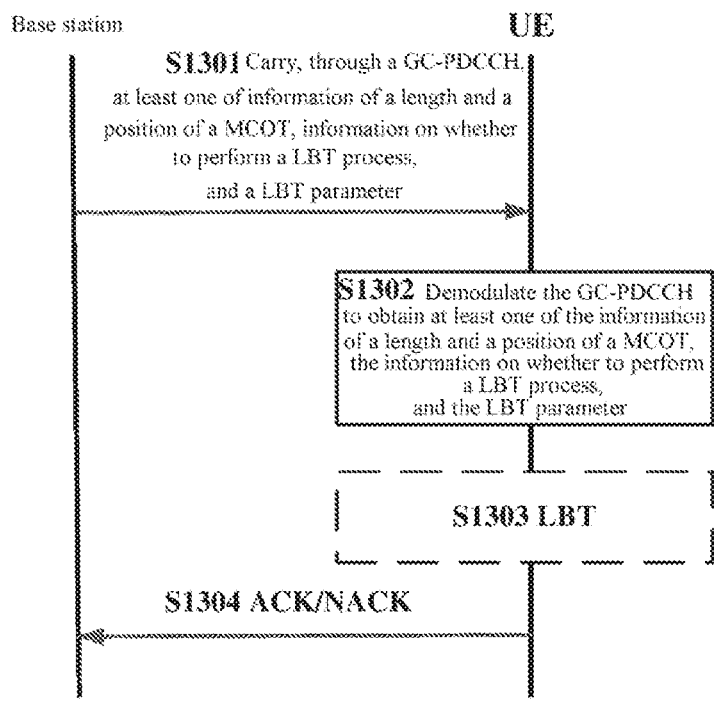
FIG. 13 is a signaling interaction diagram showing a process of transmitting at least one of information on a length and a position of a MCOT, information on whether to perform a LBT process, and a LBT parameter through a GC-PDCCH according to an embodiment of the present disclosure.

FIG. 13 is a signaling interaction diagram showing a process of transmitting, through a GC-PDCCH, at least one of information of a length and a position of a MCOT, information on whether to perform an LBT process, and a LBT parameter according to an embodiment of the present disclosure. As shown in FIG. 13, in step S1301, a base station carries, through the GC-PDCCH, at least one of information of a length and a position of a MCOT, information on whether to perform an LBT process before performing uplink transmission in the COT unit, and information of parameters related to the LBT process. Next, in step S1302, the UE obtains the above information by demodulating the GC-PDCCH. Assuming that the information obtained by the UE on whether to perform the LBT process indicates that the LBT process needs to be performed, or the UE does not receive information on whether to perform the LBT process, in step S1303, the UE performs the LBT process before uplink transmission. Next, in step S1304, when the channel is detected as idle, the UE transmits ACK/NACK information in the COT unit. Assuming that the information obtained by the UE on whether to perform the LBT process in step S1302 indicates that it is unnecessary to perform the LBT process, then in step S1304, the UE directly transmits ACK/NACK information in the COT unit. FIG. 13 only shows an example in which the channel detection process is an LBT process and the uplink transmission is ACK/NACK information. However, the channel detection process may also be a channel detection process of another type, and the uplink transmission may also be other uplink information.

<3.5 Receiving Control Information Related to Data in a Previous Time Slot Through a GC-PDCCH>

According to an embodiment of the present disclosure, the demodulation unit 1110 may be configured to demodulate information received through the GC-PDCCH to obtain control information related to data in a previous time slot of a time slot where the GC-PDCCH is located.

According to an embodiment of the present disclosure, the data in the previous time slot may be a part of data for downlink transmission, that is, the time slot where the GC-PDCCH is located will be continually used to transmit downlink data that has not been transmitted in the previous time slot, that is, the data in the previous time slot and the data in the time slot where the GC-PDCCH is located belong to the same data packet. Further, the data in the previous time slot may also include all data for downlink transmission. That is, the data in the previous time slot includes a complete data packet.

According to an embodiment of the present disclosure, the control information may be used to demodulate data in the previous time slot. That is, the control information is related to the demodulation of the data in the previous time slot.

According to an embodiment of the present disclosure, the electronic device 1100 may determine an MCS level of data in a previous time slot according to the control information. Specifically, the control information may include an index of the MCS level of the data in the previous time slot. That is, the network side device and the electronic device 1100 both store a correspondence relationship between the MCS level and the index. The electronic device 1100 may determine the MCS level when obtaining the index of the MCS level, thereby decoding the data.

Further, the electronic device 1100 may determine SFI of the data in the previous time slot according to the control information, so as to determine uplink and downlink configuration information in the previous time slot, thereby decoding the data in the previous time slot.

According to an embodiment of the present disclosure, assuming that the previous time slot is a time slot for transmitting the GC-PDCCH, since the control information is not transmitted in the previous time slot, the GC-PDCCH of the previous time slot is also not transmitted. Therefore, the electronic device 1100 is likely to be unknown of the SFI of the previous time slot. Therefore, the electronic device 1100 may receive data in a previous time slot of a time slot where the GC-PDCCH is located according to default time slot format related information SFI. For example, the electronic device 1100 may receive the data in the previous time slot according to the SFI determined in advance with the network side device. Further, the electronic device 1100 may also default that all OFDM symbols in the time slot are used for downlink transmission so as to receive data of the previous time slot on all OFDM symbols.

According to an embodiment of the present disclosure, the electronic device 1100 may store data received in a previous time slot, and demodulate the data in the previous time slot according to control information. For example, the electronic device 1100 may determine the time slot format of the data in the previous time slot according to the SFI in the control information, and determine the MCS level of the data in the previous time slot according to the MCS level in the control information, so as to demodulate the data in the previous time slot.

Figure 14:
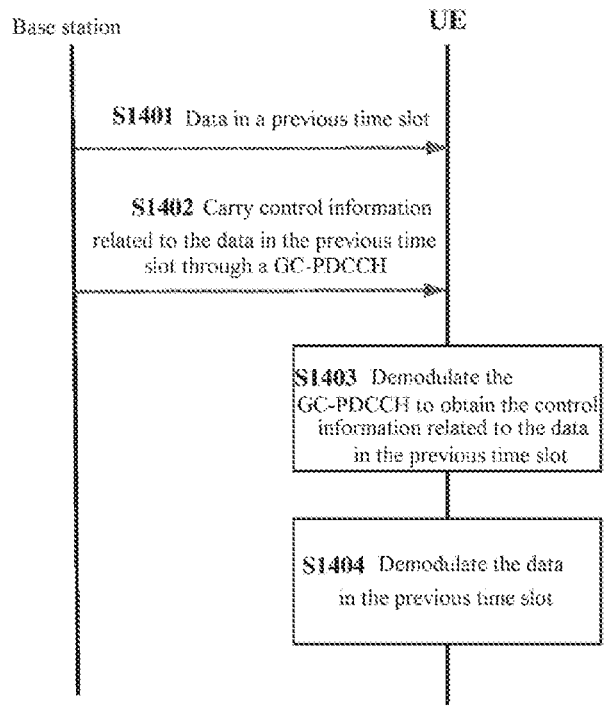
FIG. 14 is a signaling interaction diagram showing a process of transmitting control information related to data in a previous time slot through a GC-PDCCH according to an embodiment of the present disclosure.

FIG. 14 is a signaling interaction diagram showing a process of transmitting control information related to data in a previous time slot through a GC-PDCCH according to an embodiment of the present disclosure. As shown in FIG. 14, in step S1401, a base station transmits the data in the previous time slot to the UE, and the UE receives and stores the data in the previous time slot. Next, in step S1402, the base station carries the control information related to the data in the previous time slot through the GC-PDCCH in the current time slot. Next, in step S1403, the UE demodulates the GC-PDCCH to obtain the control information related to the data in the previous time slot. Next, in step S1404, the UE demodulates the data in the previous time slot according to the control information.

According to an embodiment of the present disclosure, the electronic device 1100 may receive control information related to data in a previous time slot through a GC-PDCCH in response to a notification received from a network side device. That is, when the network side device does not transmit the control information related to the data in the previous time slot in the previous time slot, the network side device may transmit the control information related to the data in the previous time slot through the GC-PDCCH in the current time slot, and transmit a notification to the electronic device 1100, so that the electronic device 1100 can receive the control information related to the data in the previous time slot through the GC-PDCCH of the current time slot in response to such a notification. Further, the electronic device 1100 may receive such a notification from the network side device by using a licensed spectrum. For example, the electronic device 1100 may receive such a notification from a network side device by using a licensed spectrum through low-level signaling (including but not limited to RRC signaling) or low-level signaling (including but not limited to physical layer signaling).

Figure 15:
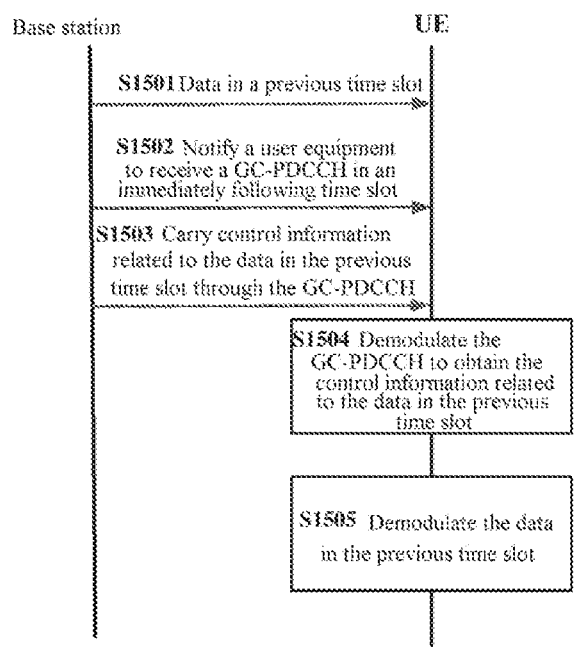
FIG. 15 is a signaling interaction diagram showing a process of transmitting a notification to a user equipment so that the user equipment receives a GC-PDCCH in a next time slot according to an embodiment of the present disclosure.

FIG. 15 is a signaling interaction diagram showing a process of transmitting a notification to a user equipment so that the user equipment receives a GC-PDCCH in a next time slot according to an embodiment of the present disclosure. As shown in FIG. 15, in step S1501, a base station transmits data in a previous time slot to a UE, and the UE receives and stores the data in the previous time slot. Next, in step S1502, the base station transmits a notification to the UE to notify the UE to receive the GC-PDCCH in a next time slot of the previous time slot. Here, steps S1501 and S1502 may be performed in a reverse order, that is, the base station may transmit a notification to the UE as long as the base station finds that the control data of the previous time slot has not been transmitted. Next, in step S1503, the base station carries the control information related to the data in the previous time slot through the GC-PDCCH of the current time slot. Next, in step S1504, the UE demodulates the GC-PDCCH to obtain the control information related to the data in the previous time slot. Next, in step S1505, the UE demodulates the data in the previous time slot according to the control information.

According to an embodiment of the present disclosure, in a case that the electronic device 1100 does not receive the GC-PDCCH in the previous time slot while the GC-PDCCH should be transmitted in the previous time slot, the electronic device 1100 may also receive the control information related to the data in the previous time slot through a GC-PDCCH in a immediately following time slot. That is, according to a transmission period of the GC-PDCCH set between the electronic device 1100 and the network side device, the GC-PDCCH should be transmitted in the previous time slot, and the electronic device 1100 does not receive the GC-PDCCH in the previous time slot, then the electronic device 1100 may determine that the network side device does not issue the GC-PDCCH in the previous time slot due to some reasons, and thus the electronic device 1100 receives the GC-PDCCH in the current time slot, regardless of the transmission period of the GC-PDCCH. In this case, the electronic device 1100 needs not to receive a notification from the network side device.

According to an embodiment of the present disclosure, the communication unit 1120 may receive a configured or reconfigured transmission period of the GC-PDCCH from a network side device. Further, the communication unit 1120 may receive the configured or reconfigured transmission period of the GC-PDCCH from the network side device by using a licensed spectrum. For example, the electronic device 1100 may receive the configured or reconfigured transmission period of the GC-PDCCH from the network side device by using the licensed spectrum through low-level signaling (including but not limited to RRC signaling) or low-level signaling (including but not limited to physical layer signaling).

In addition, the demodulation unit 1110 may also demodulate information received through the ePDCCH to obtain control information related to data in a time slot where the ePDCCH is located.

As described above, according to an embodiment of the present disclosure, the electronic device 1100 may acquire control information related to data in a previous time slot through a GC-PDCCH. In some cases, the electronic device 1100 does not receive the control information related to the data in the previous time slot in the previous time slot, thus the electronic device 1100 cannot decode the data, resulting in a waste of resources. According to an embodiment of the present disclosure, the control information related to the data in the previous time slot may be carried through a GC-PDCCH in a next time slot, so that the electronic device 1100 can decode the data in the previous time slot, thereby improving the channel utilization rate.

It can be seen that the electronic device 1100 according to the embodiment of the present disclosure may receive through the GC-PDCCH and demodulate one or more of the following information: information of a downlink transmission termination position for an unlicensed spectrum; information on a length and a time domain position of a MCOT for downlink transmission; information on whether to perform a channel detection process before performing uplink transmission in the COT unit; parameter information for the channel detection process; and control information related to data in a previous time slot of a time slot where the GC-PDCCH is located. For information in a public search region of the PDCCH, the user equipment needs to perform blind detection at two aggregation levels, and the GC-PDCCH only includes a search space of one aggregation level, thus reducing the workload for blind detection of the user equipment. Further, compared with a case of carrying the above information through the UE-specific search region of the PDCCH, the above information is carried through the GC-PDCCH, so that the user equipment obtains the above information earlier, thereby preparing for uplink feedback or uplink data transmission. It can be seen that the GC-PDCCH is designed more reasonably according to the characteristics of the NR communication system in the present disclosure.

<3.6 Receiving a Downlink Transmission Starting Position>

According to an embodiment of the present disclosure, the communication unit 1120 may receive information of a downlink transmission starting position for an unlicensed spectrum, and the demodulation unit 1110 may demodulate the received information of the downlink transmission starting position for the unlicensed spectrum to obtain the downlink transmission starting position for the unlicensed spectrum.

According to an embodiment of the present disclosure, the electronic device 1100 may receive the information of the downlink transmission starting position for the unlicensed spectrum through high-level signaling, including but not limited to RRC signaling.

According to an embodiment of the present disclosure, the demodulation unit 1110 may demodulate the received information of the downlink transmission starting position for the unlicensed spectrum to obtain one or more of the following information: indication information of a subframe corresponding to the downlink transmission starting position, indication information of a time slot corresponding to the downlink transmission starting position, and indication information of an OFDM symbol corresponding to the downlink transmission starting position.

According to an embodiment of the present disclosure, the demodulation unit 1110 may obtain one or more downlink transmission starting positions for an unlicensed spectrum.

According to an embodiment of the present disclosure, a small length of the OFDM symbol included in the MCOT for downlink transmission, that is, a large subcarrier interval, corresponds to more downlink transmission starting positions for the unlicensed spectrum obtained by the demodulation unit 1110.

According to an embodiment of the present disclosure, the demodulation unit 1110 may obtain indication information of an OFDM symbol corresponding to a downlink transmission starting position. Specifically, the indication information may include an index of the OFDM symbol within a subframe. For example, OFDM symbols in one subframe may be sorted and numbered in an order in the time domain. After obtaining an index of the OFDM symbol corresponding to the downlink transmission starting position in the subframe, the demodulation unit 1110 may determine a position of the OFDM symbol corresponding to the downlink transmission starting position in the subframe according to the index.

According to an embodiment of the present disclosure, the demodulation unit 1110 may obtain indication information of a time slot corresponding to a downlink transmission starting position and indication information of an OFDM symbol corresponding to a downlink transmission starting position. Specifically, the indication information may include an index of a time slot corresponding to the downlink transmission starting position in a subframe corresponding to the downlink transmission starting position, and an index of an OFDM symbol corresponding to the downlink transmission starting position in a time slot corresponding to the downlink transmission starting position. For example, time slots in a subframe may be sorted and numbered in an order in the time domain. After obtaining the index of the time slot corresponding to the downlink transmission starting position in the subframe, the demodulation unit 1110 may determine the position of the time slot corresponding to the downlink transmission starting position in the subframe according to the index. In addition, OFDM symbols in a time slot may be sorted and numbered in an order in the time domain. After obtaining the index of the OFDM symbol corresponding to the downlink transmission starting position in the time slot, the demodulation unit 1110 may determine a position of the OFDM symbol corresponding to the downlink transmission starting position in the time slot corresponding to the downlink transmission starting position according to the index. Therefore, the demodulation unit 1110 may determine the position of the time slot corresponding to the downlink transmission starting position and the position of the OFDM symbol corresponding to the downlink transmission starting position in the time slot corresponding to the downlink transmission starting position.

According to an embodiment of the present disclosure, the demodulation unit 1110 may acquire information of a type of a downlink transmission starting position for an unlicensed spectrum, for example, an index of the type. Further, the demodulation unit 1110 may determine, according to the index, the downlink transmission starting position is located in which one or more of the following information: a boundary position of a subframe; a boundary position of a time slot; and a middle position of the time slot. Specifically, the demodulation unit 1110 may determine that a downlink transmission starting position is located at: the boundary position of a subframe; the boundary position of a time slot; the boundary position of a subframe or the boundary position of a time slot; the boundary position of a time slot or the middle position of the time slot; or the boundary position of a subframe or the boundary position of a time slot or the middle position of the time slot.

As described above, the electronic device 1100 according to the embodiment of the present disclosure, the downlink transmission starting position for the unlicensed spectrum may be obtained through, for example, high-level signaling. In this way, compared with the LTE Licensed Assisted Access (LAA) system, there are more opportunities for downlink transmission in the unlicensed band in the NR communication system, which improves the utilization efficiency of the unlicensed spectrum.

According to the embodiment of the present disclosure, the electronic device 100 may serve as a network side device, and the electronic device 1100 may serve as a user equipment, that is, the electronic device 100 may provide a service for the electronic device 1100, therefore all embodiments regarding the electronic device 100 described above are applicable hereto.

4. Method Embodiment

Next, a wireless communication method performed by the electronic device 100 serving as a network side device in a wireless communication system according to an embodiment of the present disclosure will be described in detail.

Figure 16:
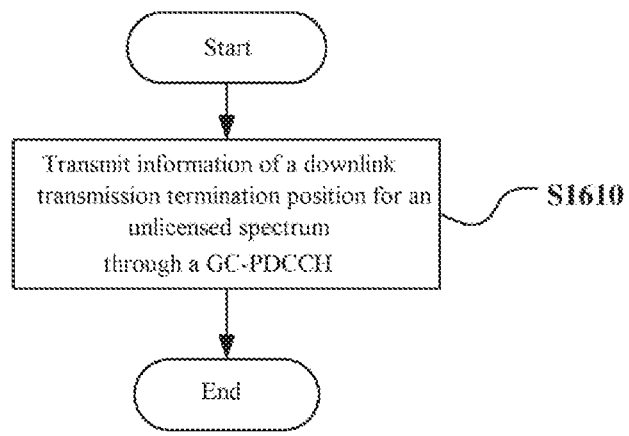
FIG. 16 is a flowchart showing a wireless communication method according to an embodiment of the present disclosure.

FIG. 16 is a flowchart showing a wireless communication method performed by the electronic device 100 serving as a network side device in a wireless communication system according to an embodiment of the present disclosure.

As shown in FIG. 16, in step S1610, information of a downlink transmission termination position for an unlicensed spectrum is transmitted through a group common physical downlink control channel GC-PDCCH.

Preferably, the method further includes: transmitting, through the GC-PDCCH, time slot format related information SFI of a time slot where the downlink transmission termination position is located.

Preferably, the method further includes: transmitting the information of the downlink transmission termination position for the unlicensed spectrum through a physical downlink control channel PDCCH.

Preferably, the method further includes: transmitting the downlink transmission termination position through the GC-PDCCH in the Nth time slot before the downlink transmission termination position, where N is a non-negative integer.

Preferably, the method further includes: when N=0, transmitting the downlink transmission termination position through the GC-PDCCH in the time slot where the downlink transmission termination position is located.

Preferably, the method further comprises: determining the value of N according to one or more of the following parameters: a length of a max channel occupy time MCOT for downlink transmission; a transmission period of the GC-PDCCH; a length of an OFDM symbol in a MCOT for downlink transmission.

Preferably, the method further includes: transmitting a length and a time domain position of the max channel occupy time MCOT for downlink transmission through the GC-PDCCH, where the MCOT includes one or more time slots.

Preferably, the method further includes: configuring the time slot format related information SFI so that: the number of switching points between uplink transmission and downlink transmission included in each time slot in the MCOT is not greater than 2; and/or the number of switching points between uplink transmission and downlink transmission included in the MCOT is not greater than a predetermined threshold.

Preferably, the method further includes: transmitting, through the GC-PDCCH, information on whether to perform a channel detection process before performing uplink transmission within a time slot of the MCOT.

Preferably, the method further includes: transmitting, through a physical downlink control channel PDCCH, information on whether to perform a channel detection process before performing uplink transmission within a time slot of the MCOT.

Preferably, the method further includes: transmitting, through the GC-PDCCH, parameter information of the channel detection process performed before performing uplink transmission within a time slot of the MCOT.

Preferably, the method further includes: configuring information of a downlink transmission starting position for the unlicensed spectrum, and transmitting the information of the downlink transmission starting position for the unlicensed spectrum.

Preferably, the method further includes: carrying the information of the downlink transmission starting position for the unlicensed spectrum through higher layer signaling.

Preferably, the information of the downlink transmission starting position for the unlicensed spectrum includes one or more of the following: indication information of a subframe corresponding to the downlink transmission starting position, indication information of a time slot corresponding to the downlink transmission starting position, and indication information of an OFDM symbol corresponding to the downlink transmission starting position.

Preferably, the information of the downlink transmission starting position for the unlicensed spectrum includes one or more starting positions.

Preferably, the method further includes: configuring the information of the downlink transmission starting position for the unlicensed spectrum according to a length of the OFDM symbol (or a size of a subcarrier interval) included in the MCOT for downlink transmission.

Preferably, the method further includes: when the length of the OFDM symbol included in the MCOT is small, that is, the subcarrier interval is large, configuring more downlink transmission starting positions for the unlicensed spectrum.

Preferably, the information of the downlink transmission starting position for the unlicensed spectrum includes indication information of the OFDM symbol corresponding to the downlink transmission starting position. Specifically, the indication information may include an index of the OFDM symbol within a subframe.

Preferably, the downlink transmission starting position for the unlicensed spectrum is located at a starting position and a middle position within a time slot.

Preferably, the information of the downlink transmission starting position for the unlicensed spectrum includes indication information of the time slot corresponding to the downlink transmission starting position and indication information of the OFDM symbol corresponding to the downlink transmission starting position. Specifically, the indication information may include an index of the time slot in the subframe and an index of the OFDM symbol in the time slot.

Preferably, the downlink transmission starting position for the unlicensed spectrum may include one or more of the following positions: a boundary position of a subframe; a boundary position of a time slot; and a middle position of the time slot.

Preferably, the downlink transmission starting position for the unlicensed spectrum may include information on a type of a starting position, and the type of the starting position includes: a boundary position of a subframe; a boundary position of a time slot; a boundary position of a subframe or a boundary position of a time slot; a boundary position of a time slot or a middle position of a time slot; and a boundary position of a subframe or a boundary position of a time slot or a middle position of a time slot.

According to the embodiment of the present disclosure, the main body that executes the above method may be the electronic device 100 according to the embodiment of the present disclosure, therefore, all the embodiments of the electronic device 100 describe above are applicable hereto.

Figure 17:
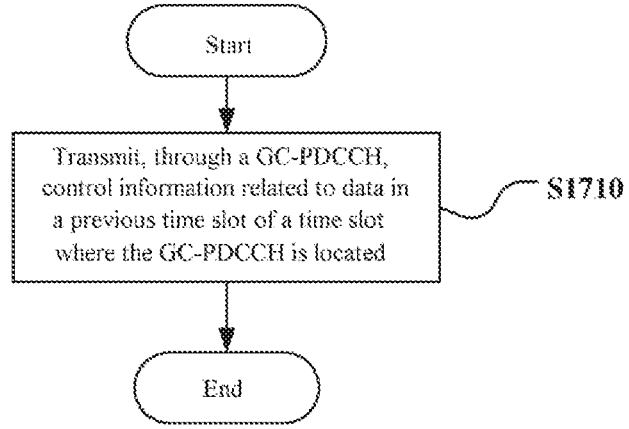
FIG. 17 is a flowchart showing a wireless communication method according to another embodiment of the present disclosure.

FIG. 17 is a flowchart showing a wireless communication method performed by the electronic device 100 serving as a network side device in a wireless communication system according to another embodiment of the present disclosure.

As shown in FIG. 17, in step S1710, control information related to data in a previous time slot of a time slot where the GC-PDCCH is located is transmitted through a group of common physical downlink control channels GC-PDCCH.

Preferably, the control information is used to indicate at least one of a modulation and coding scheme MCS level of the data and time slot format related information SFI of the data.

Preferably, the method further includes: transmitting the data in the previous time slot of the time slot where the GC-PDCCH is located according to default time slot format related information SFI.

Preferably, the method further comprises: when the control information related to the data in the previous time slot is not transmitted in the previous time slot, transmitting the control information related to the data in the previous time slot through the GC-PDCCH.

Preferably, the method further includes: transmitting a notification to the user equipment so that the user equipment receives the control information related to the data in the previous time slot through the GC-PDCCH.

Preferably, the method further includes: transmitting the notification to the user equipment through a licensed spectrum.

Preferably, the method further includes: reconfiguring a transmitting period of the GC-PDCCH to the user equipment.

Preferably, the method further includes: transmitting the reconfigured transmission period of the GC-PDCCH to the user equipment through the licensed spectrum.

According to the embodiment of the present disclosure, the main body that executes the above method may be the electronic device 100 according to the embodiment of the present disclosure, therefore, all the embodiments of the electronic device 100 described above are applicable hereto.

Next, a wireless communication method performed by the electronic device 1100 serving as a user equipment in a wireless communication system according to an embodiment of the present disclosure will be described in detail.

Figure 18:
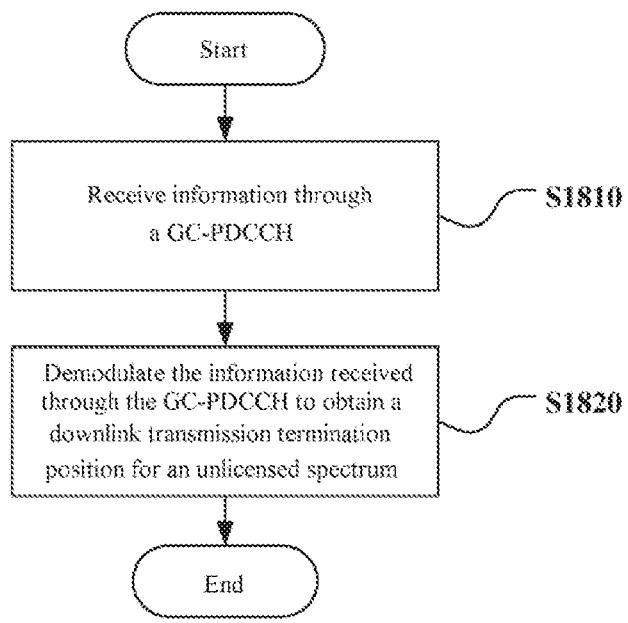
FIG. 18 is a flowchart showing a wireless communication method according to another embodiment of the present disclosure.

FIG. 18 is a flowchart showing a wireless communication method performed by the electronic device 1100 serving as a user equipment in a wireless communication system according to an embodiment of the present disclosure.

As shown in FIG. 18, in step S1810, information is received through a group of common physical downlink control channels GC-PDCCH.

Next, in step S1820, the information received through the GC-PDCCH is demodulated to obtain a downlink transmission termination position for an unlicensed spectrum.

Preferably, the method further includes: demodulating the information received through the GC-PDCCH to obtain time slot format related information SFI of a time slot where the downlink transmission termination position is located.

Preferably, the method further includes: receiving information through a physical downlink control channel PDCCH; and demodulating the information received through the PDCCH to obtain the downlink transmission termination position for the unlicensed spectrum.

Preferably, the method further includes: when the downlink transmission termination position for the unlicensed spectrum obtained by demodulating the information received through the GC-PDCCH conflicts with the downlink transmission termination position for the unlicensed spectrum obtained by demodulating the information received through the PDCCH, causing the downlink transmission termination position for the unlicensed spectrum obtained by demodulating the information received through the PDCCH to be prevailed.

Preferably, the method further includes: demodulating the information received through the GC-PDCCH to obtain a length and a time domain position of a max channel occupy time MCOT for downlink transmission, where the MCOT includes one or more time slots.

Preferably, the method further includes: demodulating the information received through the GC-PDCCH to determine whether to perform a channel detection process before performing uplink transmission within a time slot of the MCOT.

Preferably, the method further includes: receiving information through a physical downlink control channel PDCCH; and demodulating the information received through the PDCCH to determine whether to perform a channel detection process before performing uplink transmission in a time slot of the MCOT.

Preferably, the method further includes: when the determination result on whether to perform a channel detection process before performing uplink transmission in the time slot of the MCOT determined by demodulating the information received through the GC-PDCCH conflicts with the determination result on whether to perform a channel detection process before performing uplink transmission in the time slot of the MCOT determined by demodulating the information received through the PDCCH, causing the determination result on whether to perform a channel detection process before performing uplink transmission in the time slot of the MCOT determined by demodulating the information received through the PDCCH to be prevailed.

Preferably, the method further includes: demodulating the information received through the GC-PDCCH to obtain a parameter of the channel detection process performed before performing uplink transmission in the time slot of the MCOT.

Preferably, the method further comprises: receiving information of a downlink transmission starting position for an unlicensed spectrum, and demodulating the received information of the downlink transmission starting position for the unlicensed spectrum to obtain the downlink transmission starting position for the unlicensed spectrum.

Preferably, the information of the downlink transmission starting position for the unlicensed spectrum is received through high-level signaling.

Preferably, the method further includes: demodulating the received information of the downlink transmission starting position for the unlicensed spectrum to obtain one or more of the following information: indication information of a subframe corresponding to the downlink transmission starting position, indication information of a time slot corresponding to the downlink transmission starting position, and indication information of an OFDM symbol corresponding to the downlink transmission starting position.

Preferably, in the method, the obtained downlink transmission starting position for the unlicensed spectrum includes one or more downlink transmission starting positions for the unlicensed spectrum.

Preferably, when the length of the OFDM symbol included in the MCOT for the downlink transmission is small, that is, the subcarrier interval is large, more downlink transmission starting positions for the unlicensed spectrum are obtained.

Preferably, the method further includes: obtaining the indication information of the OFDM symbol corresponding to the downlink transmission starting position. Specifically, the indication information includes an index of the OFDM symbol within a subframe.

Preferably, the method further includes: determining a position of the OFDM symbol corresponding to a downlink transmission starting position in the subframe according to an index of the OFDM symbol in the subframe.

Preferably, the method further includes: obtaining the indication information of the time slot corresponding to the downlink transmission starting position and the indication information of the OFDM symbol corresponding to the downlink transmission starting position. Specifically, the indication information includes an index of the time slot corresponding to the downlink transmission starting position in a subframe corresponding to the downlink transmission starting position, and an index of the OFDM symbol corresponding to the downlink transmission starting position in the time slot corresponding to the downlink transmission starting position.

Preferably, the method further includes: determining a position of the time slot corresponding to the downlink transmission starting position in the subframe according to the index of the time slot corresponding to the downlink transmission starting position in the subframe; and determining a position of the OFDM symbol corresponding to the downlink transmission starting position in the time slot corresponding to the downlink transmission starting position according to the index of the OFDM symbol corresponding to the downlink transmission position in the time slot.

Preferably, the method further includes: obtaining information of a type of the downlink transmission starting position for the unlicensed spectrum; and determining, according to the information of the type, that the downlink transmission starting position is located in which one or more of the following positions: a boundary position of a subframe; a boundary position of a time slot; a middle position of a time slot. Specifically, the method may further include: determining, according to the information of the type, that the downlink transmission starting position is located at: the boundary position of a subframe; the boundary position of a time slot; the boundary position of a subframe or the boundary position of a time slot; the boundary position of a time slot or the middle position of the time slot; or the boundary position of the subframe or the boundary position of the time slot or the middle position of the time slot.

According to the embodiment of the present disclosure, the main body that executes the above method may be the electronic device 1100 according to the embodiment of the present disclosure, therefore, all the embodiments of the electronic device 1100 described above are applicable to hereto.

Figure 19:
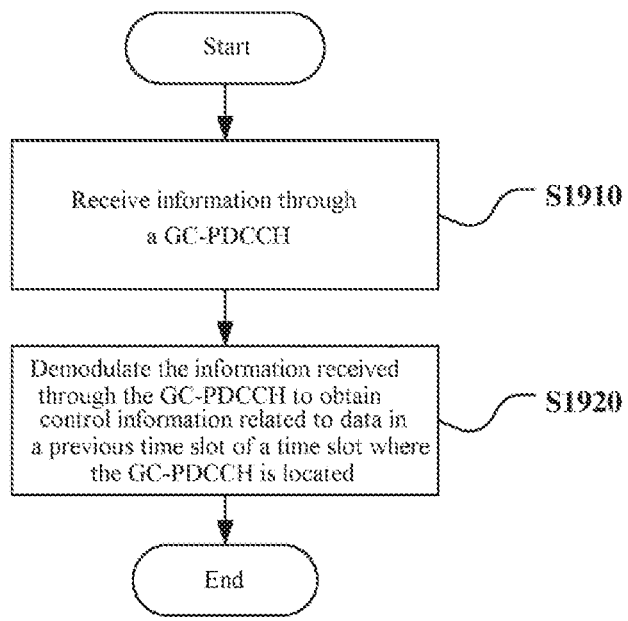
FIG. 19 is a flowchart showing a wireless communication method according to another embodiment of the present disclosure.

FIG. 19 is a flowchart showing a wireless communication method performed by the electronic device 1100 serving as a user equipment in a wireless communication system according to another embodiment of the present disclosure.

As shown in FIG. 19, in step S1910, information is received through a group of common physical downlink control channels GC-PDCCH.

Next, in step S1920, the information is demodulated to obtain control information related to data in a previous time slot of a time slot where the GC-PDCCH is located.

Preferably, the method further comprises: determining at least one of a modulation and coding scheme MCS level of the data and time slot format related information SFI of the data according to the control information.

Preferably, the method further includes: storing the data received in the previous time slot; and demodulating the data in the previous time slot according to the control information.

Preferably, the method further includes: receiving the data in the previous time slot of the time slot where the GC-PDCCH is located according to default time slot format related information SFI.

Preferably, the method further includes: in response to a notification received from a network side device, receiving the control information related to the data in the previous time slot through the GC-PDCCH.

Preferably, the method further includes: receiving the notification from the network side device through a licensed spectrum.

Preferably, the method further includes: receiving a reconfigured transmitting period of the GC-PDCCH from the network side device.

Preferably, the method further comprises: receiving the reconfigured transmission period of the GC-PDCCH from the network side device through the licensed spectrum.

According to the embodiment of the present disclosure, the main body that executes the above method may be the electronic device 1100 according to the embodiment of the present disclosure, therefore, all the embodiments of the electronic device 1100 described above are applicable to hereto.

5. Application Examples

The technique of the present disclosure may be applied to various products.

For example, the network side device may be realized as any type of a base station of, such as a macro eNB and a small eNB, and may also be implemented as any type of a base station in a 5G system (gNB). The small eNB may be an eNB such as a pico eNB, a micro eNB and a home (femto) eNB that covers a cell smaller than a macro cell. Alternatively, the base station may also be realized as a base station of any other type, such as a NodeB and a base transceiver station (BTS). The base station may include a main body (which is also referred to as a base station device) configured to control wireless communications, and one or more remote radio heads (RRH) arranged in a different place from the main body.

The user equipment may be realized as a mobile terminal (such as a smartphone, a tablet personal computer (PC), a notebook PC, a portable game terminal, a portable/dongle type mobile router, and a digital camera device), or an in-vehicle terminal (such as a car navigation device). The user equipment may also be realized as a terminal (which is also called a machine type communication (MTC) terminal) that performs machine-to-machine (M2M) communication. In addition, the user equipment may be a wireless communication module (such as an integrated circuit module including a single die) mounted on each of the above user equipments.

Application Examples of the Base Station

First Application Example

Figure 20:
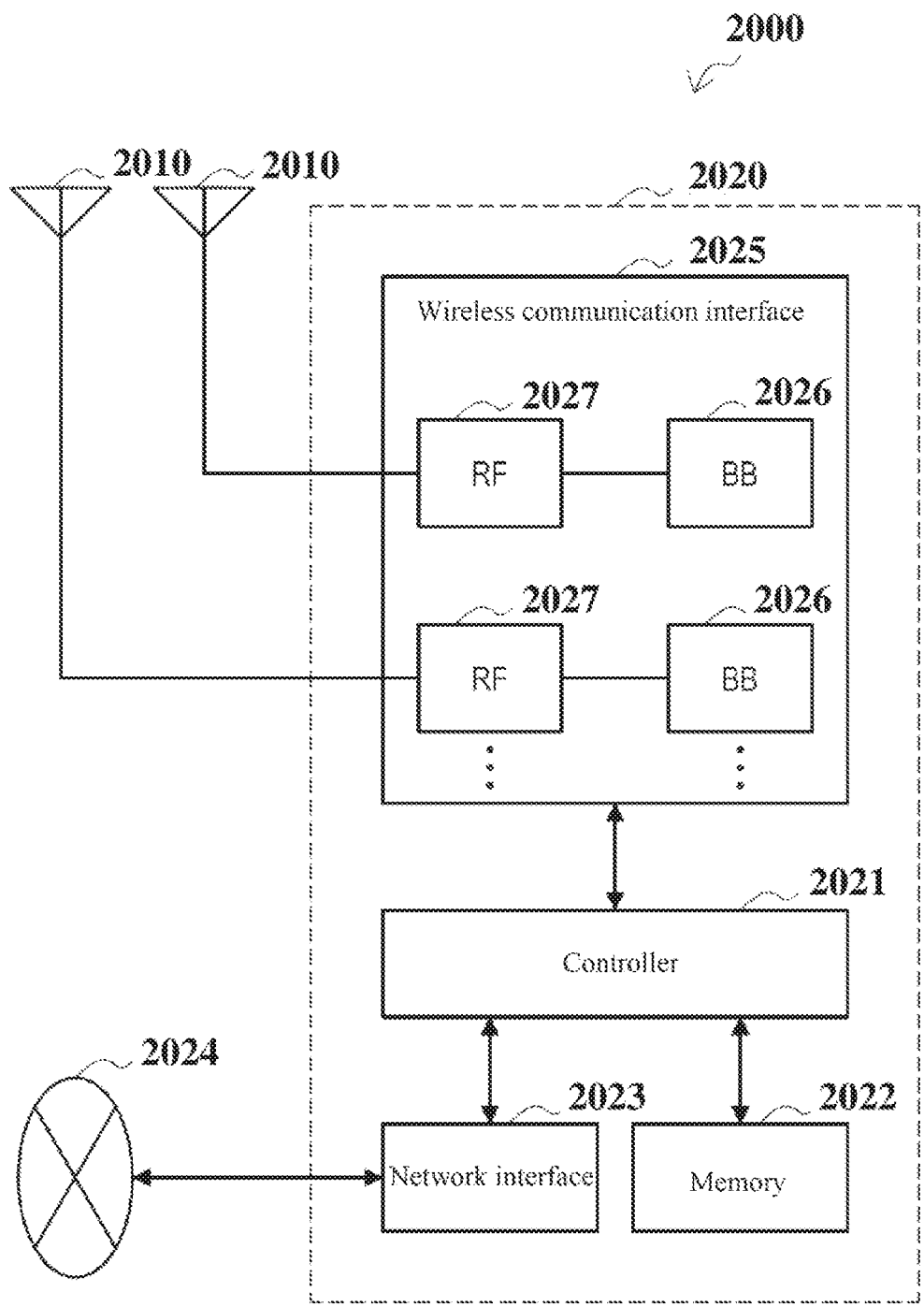
FIG. 20 is a block diagram showing a first example of a schematic configuration of an Evolved Node B (eNB)

FIG. 20 is a block diagram showing a first example of a schematic configuration of an eNB to which the technique of the disclosure may be applied. The eNB 2000 includes a single or multiple antennas 2010 and a base station device 2020. The base station device 2020 and each of the antennas 2010 may be connected via a RF cable.

Each of the antennas 2010 includes a single or multiple antenna elements (such as multiple antenna elements included in a multiple-input multiple-output (MIMO) antenna), and are used for transmitting and receiving wireless signals by the base station device 2020. The eNB 2000 may include the multiple antennas 2010, as shown in FIG. 20. For example, the multiple antennas 2010 may be compatible with multiple frequency bands used by the eNB 2000. Although FIG. 200 shows an example in which the eNB 2000 includes the multiple antennas 2010, the eNB 2000 may also include a single antenna 2010.

The base station device 2020 includes a controller 2021, a memory 2022, a network interface 2023, and a wireless communication interface 2025.

The controller 2021 may be, for example, a CPU or a DSP, and operates various functions of a higher layer of the base station device 2020. For example, the controller 2021 generates a data packet based on data in a signal processed by the wireless communication interface 2025, and transfers the generated packet via the network interface 2023. The controller 2021 may bundle data from multiple baseband processors to generate bundled packet, and transfer the generated bundled packet. The controller 2021 may have logical functions of performing control such as radio resource control, radio bearer control, mobility management, admission control, and scheduling. The control may be performed in conjunction with an adjacent eNB or a core network node. The memory 2022 includes RAM and ROM, and stores a program that is executed by the controller 2021, and various types of control data (such as a terminal list, transmitting power data, and scheduling data).

The network interface 2023 is a communication interface for connecting the base station device 2020 to a core network 2024. The controller 2021 may communicate with a core network node or another eNB via the network interface 2023. In that case, the eNB 2000, and the core network node or the other eNB may be connected to each other through a logical interface (such as an S1 interface and an X2 interface). The network interface 2023 may be a wired communication interface or a wireless communication interface for a wireless backhaul line. If the network interface 2023 is a wireless communication interface, the network interface 2023 may use a higher frequency band for wireless communication than a frequency band used by the wireless communication interface 2025.

The wireless communication interface 2025 supports any cellular communication scheme (such as Long Term Evolution (LTE) and LTE-Advanced), and provides wireless connection to a terminal positioned in a cell of the eNB 2000 via the antenna 2010. The wireless communication interface 2025 may typically include, for example, a baseband (BB) processor 2026 and an RF circuit 2027. The BB processor 2026 may perform, for example, coding/decoding, modulation/demodulation and multiplexing/de-multiplexing, and perform various types of signal processes of the layer (for example L1, media access control (MAC), radio link control (RLC) and packet data convergence protocol (PDCP)). Instead of the controller 2021, the BB processor 2026 may have a part or all of the above logical functions. The BB processor 2026 may be a memory storing communication control programs, or a module including a processor and a related circuit which are configured to execute the programs. Updating the program may allow the functions of the BB processor 2026 to be changed. The module may be a card or a blade that is inserted into a slot of the base station device 2020. Alternatively, the module may be a chip that is mounted on the card or the blade. In addition, the RF circuit 2027 may include, for example, a frequency mixer, a filter or an amplifier, and transmits and receives wireless signals via the antenna 2010.

As shown in FIG. 20, the wireless communication interface 2025 may include multiple BB processors 2026. For example, the multiple BB processors 2026 may be compatible with multiple frequency bands used by the eNB 2000. As shown in FIG. 20, the wireless communication interface 2025 may include multiple RF circuits 2027. For example, the multiple RF circuits 2027 may be compatible with multiple antenna elements. Although FIG. 20 shows an example in which the wireless communication interface 2025 includes multiple BB processors 2026 and multiple RF circuits 2027, the wireless communication interface 2025 may include a single BB processor 2026 and a single RF circuit 2027.

Second Application Example

Figure 21:
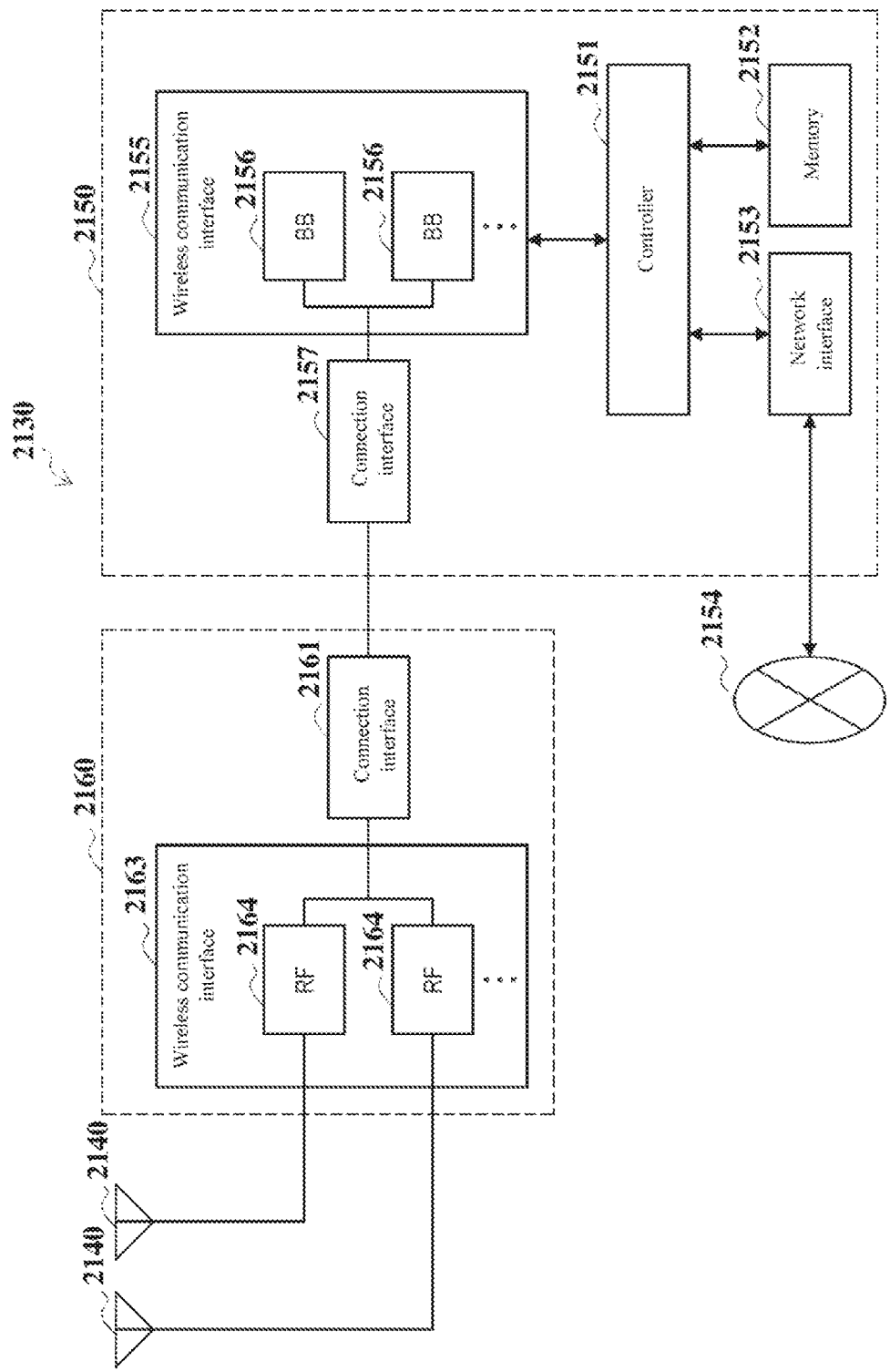
FIG. 21 is a block diagram showing a second example of a schematic configuration of the eNB.

FIG. 21 is a block diagram showing a second example of a schematic configuration of an eNB to which the technique of the present disclosure may be applied. An eNB 2130 includes a single or multiple antennas 2140, a base station device 2150 and an RRH 2160. Each antenna 2140 and the RRH 2160 may be connected to each other via an RF cable. The base station device 2150 and the RRH 2160 may be connected to each other via a high-speed line such as a fiber cable.

Each of the antennas 2140 includes a single or multiple antennal elements (such as multiple antenna elements included in a multiple-input multiple-output (MIMO) antenna), and is used for the RRH 2160 to transmit and receive wireless signals. As shown in FIG. 21, the eNB 2130 may include multiple antennas 2140. For example, the multiple antennas 2140 may be compatible with multiple frequency bands used by the eNB 2130. Although FIG. 21 shows an example that the eNB 2130 includes multiple antennas 2140, the eNB 2130 may also include a single antenna 2140.

The base station device 2150 includes a controller 2151, a memory 2152, a network interface 2153, a wireless communication interface 2155, and a connection interface 2157. The controller 2151, the memory 2152, and the network interface 2153 are the same as the controller 2021, the memory 2022, and the network interface 2023 described with reference to FIG. 20.

The wireless communication interface 2155 supports any cellular communication solution (such as LTE and LTE-advanced), and provides wireless communication with a terminal located in a sector corresponding to the RRH 2160 via the RRH 2160 and the antenna 2140. The wireless communication interface 2155 may typically include, for example, a BB processor 2156. Other than connecting to an RF circuit 2164 of the RRH 2160 via the connection interface 2157, the BB processor 2156 is the same as the BB processor 2026 described with reference to FIG. 20. As show in FIG. 21, the wireless communication interface 2155 may include multiple BB processors 2156. For example, the multiple BB processors 2156 may be compatible with the multiple frequency bands used by the eNB 2130. Although FIG. 21 shows an example in which the wireless communication interface 2155 includes multiple BB processors 2156, the wireless communication interface 2155 may also include a single BB processor 2156.

The connection interface 2157 is an interface for connecting the base station device 2150 (the wireless communication interface 2155) to the RRH 2160. The connection interface 2157 may also be a communication module to connect the base station device 2150 (the wireless communication interface 2155) to the RRH 2160 for communication in the above high-speed line.

The RRH 2160 includes a connection interface 2161 and a wireless communication interface 1963.

The connection interface 2161 is an interface for connecting the RRH 2160 (the wireless communication interface 1963) to the base station device 2150. The connection interface 2161 may also be a communication module for the communication in the above high-speed line.

The wireless communication interface 2163 transmits and receives wireless signals via the antenna 2140. The wireless communication interface 2163 may typically include, for example, the RF circuit 2164. The RF circuit 2164 may include, for example, a frequency mixer, a filter and an amplifier, and transmits and receives wireless signals via the antenna 2140. The wireless communication interface 2163 may include multiple RF circuits 2164, as shown in FIG. 21. For example, the multiple RF circuits 2164 may support multiple antenna elements. Although FIG. 21 shows the example in which the wireless communication interface 2163 includes the multiple RF circuits 2164, the wireless communication interface 2163 may also include a single RF circuit 2164.

In the eNB 2000 shown in FIG. 20 and the eNB 2130 shown in FIG. 21, the configuration unit 110 described with reference to FIG. 1 may be implemented by the controller 2021 and/or the controller 2151. At least a part of the functions may be implemented by a controller 2021 and a controller 2151. For example, the controller 2021 and the controller 2151 may perform the functions of configuring the GC-PDCCH and PDCCH by executing instructions stored in the corresponding memory.

Application Example of the Terminal Device

First Application Example

Figure 22:
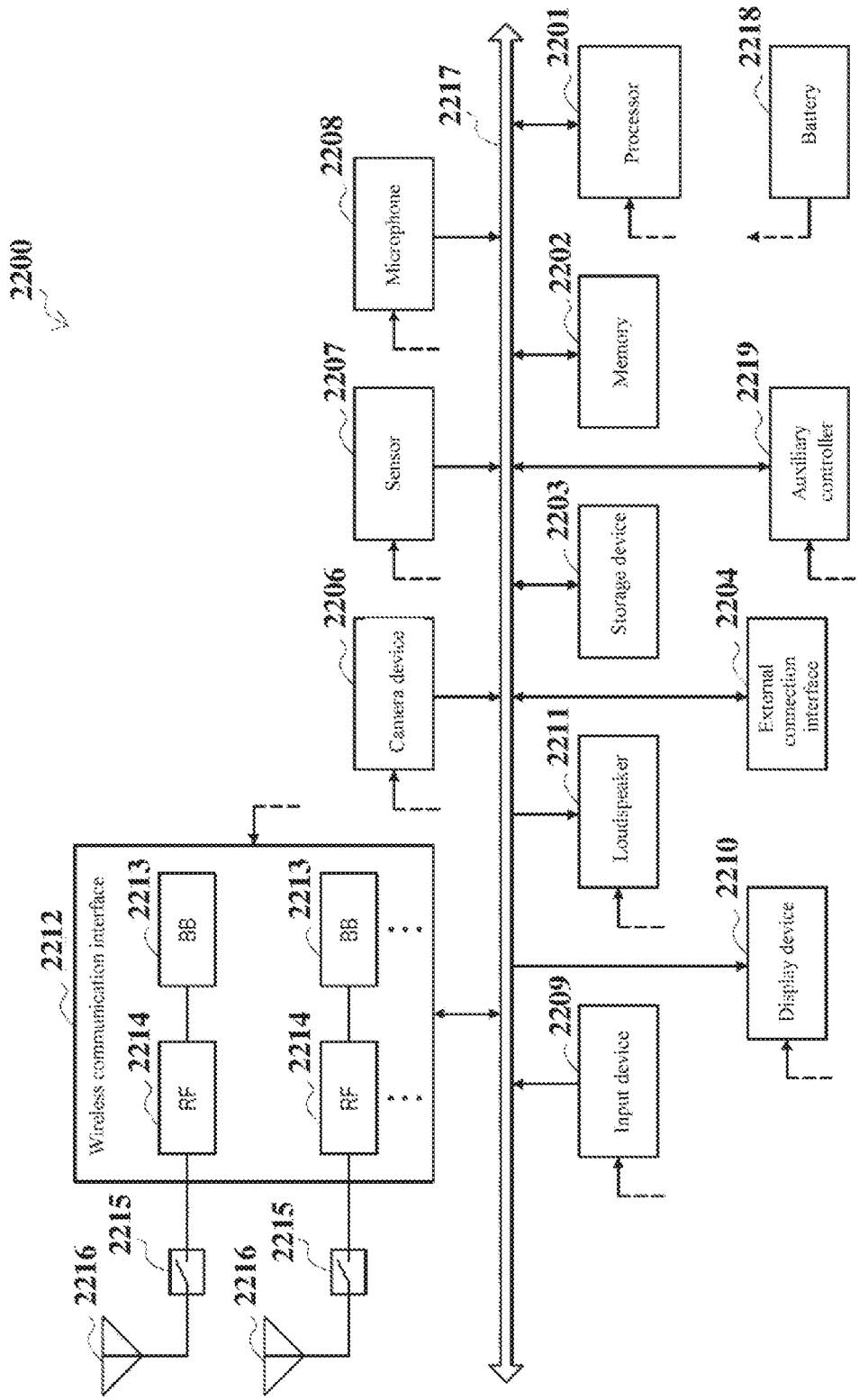
FIG. 22 is a block diagram showing an example of a schematic configuration of a smartphone.

FIG. 22 is a block diagram showing an example of a schematic configuration of a smartphone 2200 to which the technique of the present disclosure may be applied. The smart phone 2200 includes a processor 2201, a memory 2202, a storage device 2203, an external connection interface 2204, a camera device 2206, a sensor 2207, a microphone 2208, an input device 2209, a display device 2210, a loudspeaker 2211, a wireless communication interface 2212, a single or multiple antenna switches 2215, a single or multiple antennas 2216, a bus 2217, a battery 2218 and an auxiliary controller 2219.

The processor 2201 may be, for example, a CPU or a system on chip (SoC), and control functions of an application layer and other layers of the smart phone 2200. The memory 2202 includes an RAM and an ROM, and stores programs executed by the processor 2201 and data. The storage device 2203 may include a storage medium such as a semiconductor memory and a hard disk. The external connection interface 2204 is an interface for connecting an external device (such as a memory card and a universal serial bus (USB) device) to the smart phone 2200.

The camera device 2206 includes an image sensor (such as a charge coupled device (CCD) and a complementary metal oxide semiconductor (CMOS)) and generates a captured image. The sensor 2207 may include a group of sensors such as a measurement sensor, a gyro sensor, a geomagnetic sensor, and an acceleration sensor. The microphone 2208 converts sounds that are inputted to the smart phone 2200 into audio signals. The input device 2209 includes, for example, a touch sensor configured to detect touch onto a screen of the display device 2210, a keypad, a keyboard, a button, or a switch, and receive an operation or information inputted from a user. The display device 2210 includes a screen such as a liquid crystal display (LCD) and an organic light-emitting diode (OLED) display, and displays an output image of the smart phone 2200. The speaker 2211 converts the audio signal that is outputted from the smart phone 2200 to sound.

The wireless communication interface 2212 supports any cellular communication scheme (such as LTE and LTE-Advanced), and performs wireless communications. The wireless communication interface 2212 may typically include, for example, a BB processor 2213 and an RF circuit 2214. The BB processor 2213 may perform for example coding/decoding, modulation/demodulation and multiplexing/de-multiplexing, and perform various types of signal processes for wireless communications. The RF circuit 2214 may include, for example, a frequency mixer, a filter and an amplifier, and transmits and receives wireless signals via the antenna 2216. The wireless communication interface 2212 may be a chip module having the BB processor 2213 and the RF circuit 2214 integrated thereon. As shown in FIG. 22, the wireless communication interface 2212 may include multiple BB processors 2213 and multiple RF circuits 2214. Although FIG. 22 shows an example in which the wireless communication interface 2212 includes multiple BB processors 2213 and multiple RF circuits 2214, the wireless communication interface 2212 may also include a single BB processor 2213 and a single RF circuit 2214.

Furthermore, in addition to the cellular communication scheme, the wireless communication interface 2212 may support another type of wireless communication scheme such as a short-distance wireless communication scheme, a near field communication scheme, and a radio local area network (LAN) scheme. In this case, the wireless communication interface 2212 may include the BB processor 2213 and the RF circuit 2214 for each wireless communication scheme.

Each of the antenna switches 2215 switches connection destinations of the antennas 2216 among multiple circuits (such as circuits for different wireless communication schemes) included in the wireless communication interface 2212.

Each of the antennas 2216 includes a single or multiple antenna elements (such as the multiple antenna elements included in an MIMO antenna), and is used for the wireless communication interface 2212 to transmit and receive wireless signals. The smartphone 2200 may include the multiple antennas 2216, as shown in FIG. 22. Although FIG. 22 shows the example in which the smartphone 2200 includes the multiple antennas 2216, the smartphone 2200 may also include a single antenna 2216.

Furthermore, the smart phone 2200 may include the antenna 2216 for each wireless communication scheme. In this case, the antenna switch 2215 may be omitted from the configuration of the smart phone 2200.

The bus 2217 connects the processor 2201, the memory 2202, the storage device 2203, the external connection interface 2204, the camera device 2206, the sensor 2207, the microphone 2208, the input device 2209, the display device 2210, the speaker 2211, the wireless communication interface 2212, and the auxiliary controller 2219 to each other. The battery 2218 supplies power to the various modules of the smartphone 2200 shown in FIG. 22 via a feeder line. The feeder line is partially shown with a dash line in FIG. 22. The auxiliary controller 2219 operates a minimum necessary function of the smart phone 2200, for example, in a sleep mode.

In the smartphone 2200 shown in FIG. 22, the demodulation unit 1110 described with reference to FIG. 11 may be implemented by the processor 2201 or the auxiliary controller 2219. At least a part of the functions may be implemented by the processor 2201 and the auxiliary controller 2219. For example, the processor 2201 and the auxiliary controller 2219 may perform the function of demodulating downlink information by executing instructions stored in the memory 2202 or the storage device 2203.

Second Application Example

Figure 23:
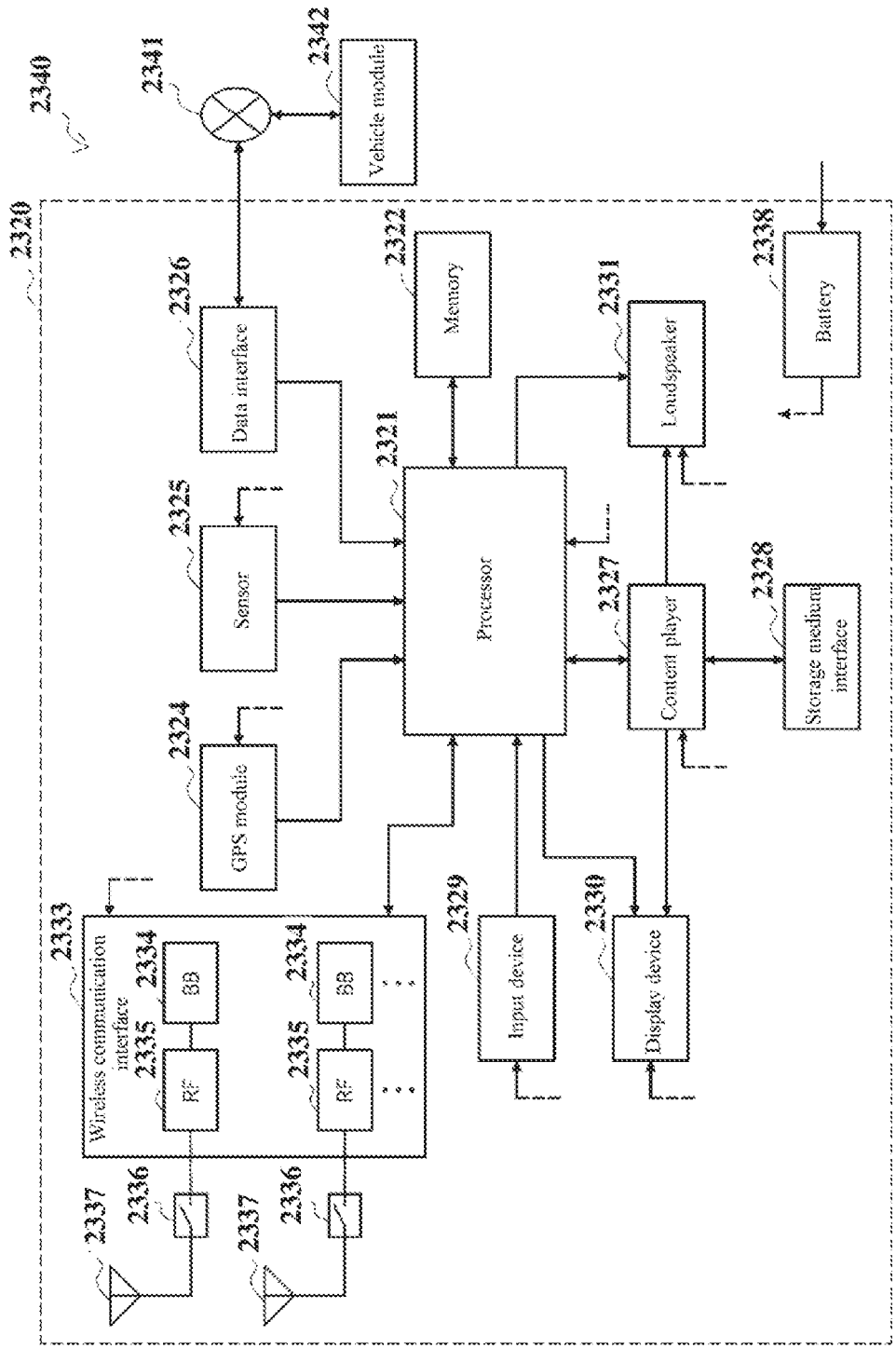
FIG. 23 is a block diagram showing an example of a schematic configuration of a car navigation device.

FIG. 23 is a block diagram showing an example of a schematic configuration of a vehicle navigation device 2320 to which the technique of the present disclosure may be applied. The car navigation device 2320 includes a processor 2321, a memory 2322, a global positioning system (GPS) module 2324, a sensor 2325, a data interface 2326, a content player 2327, a storage medium interface 2328, an input device 2329, a display device 2330, a speaker 2331, a wireless communication interface 2333, a single or multiple antenna switches 2336, a single or multiple antennas 2337 and a battery 2338.

The processor 2321 may be, for example, a CPU or SoC, and controls the navigation function and additional functions of the car navigation device 2320. The memory 2322 includes an RAM and an ROM, and stores programs executed by the processor 2321, and data.

The GPS module 2324 measures a location of the car navigation device 2320 (such as a latitude, a longitude and a height) using a GPS signal received from a GPS satellite. The sensor 2325 may include a group of sensors such as a gyroscope sensor, a geomagnetic sensor and an air pressure sensor. The data interface 2326 is connected to, for example, an in-vehicle network 2341 via a terminal that is not shown, and acquires data generated by the vehicle (such as vehicle speed data).

The content player 2327 reproduces content stored in a storage medium (such as a CD and a DVD) that is inserted into the storage medium interface 2328. The input device 2329 includes, for example, a touch sensor configured to detect touch onto a screen of the display device 2330, a button, or a switch, and receives an operation or information inputted from a user. The display device 2330 includes a screen such as a LCD or an OLED display, and displays an image for the navigation function or content that is reproduced. The speaker 2331 outputs sounds for the navigation function or the content that is reproduced.

The wireless communication interface 2333 supports any cellular communication scheme (such as LTE and LTE-advanced), and performs wireless communications. The wireless communication interface 2333 may typically include, for example, a BB processor 2334 and an RF circuit 2335. The BB processor 2334 may perform, for example, coding/decoding, modulating/demodulating and multiplexing/de-multiplexing, and perform various types of signal processes for wireless communications. The RF circuit 2335 may include, for example, a frequency mixer, a filter and an amplifier, and transmits and receives wireless signals via the antenna 2337. The wireless communication interface 2333 may also be a chip module having the BB processor 2334 and the RF circuit 2335 integrated thereon. As shown in FIG. 23, the wireless communication interface 2333 may include multiple BB processors 2334 and multiple RF circuits 2335. Although FIG. 23 shows the example in which the wireless communication interface 2333 includes the multiple BB processors 2334 and the multiple RF circuits 2335, the wireless communication interface 2333 may also include a single BB processor 2334 or a single RF circuit 2335.

Furthermore, in addition to a cellular communication scheme, the wireless communication interface 2333 may support another type of wireless communication scheme such as a short-distance wireless communication scheme, a near field communication scheme, and a wireless LAN scheme. In this case, the wireless communication interface 2333 may include the BB processor 2334 and the RF circuit 2335 for each wireless communication scheme.

Each of the antenna switches 2336 switches connection destinations of the antenna 2337 among multiple circuits (such as circuits for different wireless communication schemes) included in the wireless communication interface 2333.

Each of the antennas 2337 includes a single or multiple antenna elements (such as the multiple antenna elements included in a MIMO antenna) and is used for the wireless communication interface 2333 to transmit and receive wireless signals. The car navigation device 2320 may include multiple antennas 2337, as shown in FIG. 23. Although FIG. 23 shows the example in which the car navigation device 2320 includes the multiple antennas 2337, the car navigation device 2320 may also include a single antenna 2337.

Furthermore, the car navigation device 2320 may include the antenna 2337 for each wireless communication scheme. In this case, the antenna switch 2336 may be omitted from the configuration of the car navigation device 2320.

The battery 2338 supplies power to the various modules of the car navigation device 2320 shown in FIG. 23 via feeder lines that are partially shown as dashed lines in FIG. 23. The battery 2338 accumulates power supplied from the vehicle.

In the car navigation device 2320 shown in FIG. 23, the demodulation unit 1110 described with reference to FIG. 11 may be implemented by the processor 2321. At least a part of the functions may be implemented by the processor 2321. For example, the processor 2321 may perform the function of demodulating the downlink information by executing instructions stored in the memory 2322.

The technique of the disclosure may also be implemented as an in-vehicle system (or a vehicle) 2340 including one or more of the car navigation device 2320, an in-vehicle network 2341 and a vehicle module 2342. The vehicle module 2342 generates the vehicle data (such as a vehicle speed, a motor speed and fault information), and outputs the generated data to the in-vehicle network 2341.

The preferred embodiments of the present disclosure are described above with reference to the drawings, but the present disclosure is not limited to the above examples. Those skilled in the art may make various alternations and modifications within the scope of the claims, and it should be understood that these alternations and modifications should naturally fall within the technical scope of the present disclosure.

For example, units shown by dashed boxes in the functional block diagram shown in the drawings all indicate that the functional unit is optional in the corresponding device, and each optional functional unit may be combined in an appropriate manner to achieve a desired function.

For example, multiple functions included in one unit in the above embodiments may be implemented by separate devices. Alternatively, multiple functions implemented by multiple units in the above embodiments may be implemented by separate devices, respectively. In addition, one of the above functions may be implemented by multiple units. Further, such a configuration is included in the technical scope of the present disclosure.

In this specification, the steps described in the flowchart include not only processes performed in time series in the order described, but also processes performed in parallel or individually instead of having to be performed in time series. Further, even in the steps processed in a time series, the order can be appropriately changed.

Although the embodiments of the present disclosure have been described above in detail in connection with the drawings, it is appreciated that the embodiments as described above are merely illustrative but not limitative of the present disclosure. Those skilled in the art may make various modifications and variations to the above embodiments without departing from the spirit and scope of the disclosure. Therefore, the scope of the disclosure is defined merely by the appended claims and their equivalents.

The invention claimed is:

1. An electronic device operating in a base station and comprising a processing circuit that:
   transmits data in a previous time slot of a time slot where a Group Common-Physical Downlink Control Channel (GC-PDCCH) is to be transmitted;
   identifies a failure to transmit, in the previous time slot, control information related to the data; and
   based on the identified failure, transmits, through the GC-PDCCH in the time slot, the control information related to the data in the previous time slot,
   wherein the processing circuit transmits the data in the previous time slot of the time slot where the GC-PDCCH is located according to default time slot format related information (SFI).

2. The electronic device according to claim 1, wherein the control information is used to indicate at least one of a modulation and coding scheme (MCS) level of the data or SFI of the data.

3. The electronic device according to claim 1, wherein the processing circuit transmits the control information related to the data in the previous time slot through the GC-PDCCH when the control information related to the data in the previous time slot is not transmitted in the previous time slot.

4. The electronic device according to claim 1, wherein the processing circuit transmits a notification to a user equipment such that the user equipment receives the control information related to the data in the previous time slot through the GC-PDCCH.

5. The electronic device according to claim 4, wherein the processing circuit transmits the notification to the user equipment through a licensed spectrum.

6. The electronic device according to claim 1, wherein the processing circuit reconfigures a transmission period of the GC-PDCCH to a user equipment.

7. The electronic device according to claim 6, wherein the processing circuit transmits the reconfigured transmission period of the GC-PDCCH to the user equipment through a licensed spectrum.

8. The electronic device according to claim 1, wherein the electronic device is a network side device in a New Radio (NR) communication system.

9. An electronic device operating in a mobile device and comprising a processing circuit that:
   receives, from a base station, data in a previous time slot of a time slot where a Group Common-Physical Downlink Control Channel (GC-PDCCH) is to be received; and
   based on an failure to receive, in the previous time slot, control information related to the data, receives, through the GC-PDCCH in the time slot, the control information related to the data in the previous time slot,
   wherein the processing circuit receives the data in the previous time slot of the time slot where the GC-PDCCH is located according to default time slot format related information (SFI).

10. The electronic device according to claim 9, wherein the processing circuit determines at least one of a modulation and coding scheme (MCS) level of the data and SFI of the data according to the control information.

11. The electronic device according to claim 9, wherein the processing circuit:
    stores data received in the previous time slot; and
    demodulates the data in the previous time slot according to the control information.

12. The electronic device according to claim 9, wherein the processing circuit receives the control information related to the data in the previous time slot through the GC-PDCCH in response to a notification received from a network side device.

13. The electronic device according to claim 12, wherein the processing circuit receives the notification from the network side device through a licensed spectrum.

14. The electronic device according to claim 9, wherein the processing circuit receives a reconfigured transmission period of the GC-PDCCH from a network side device.

15. The electronic device according to claim 14, wherein the processing circuit receives the reconfigured transmission period of the GC-PDCCH from the network side device through a licensed spectrum.

16. The electronic device according claim 9, wherein the electronic device is a user side device in a New Radio (NR) communication system.

17. A wireless communication method performed by an electronic device operating in a base station and that includes a transceiver and processor, the method comprising:
    transmitting data in a previous time slot of a time slot where a Group Common-Physical Downlink Control Channel (GC-PDCCH) is to be transmitted;
    identifying a failure to transmit, in the previous time slot, control information related to the data; and based on the identified failure, transmitting, through the GC-PDCCH in the time slot, the control information related to the data in the previous time slot, wherein the method further comprises receiving the data in the previous time slot of the time slot where the GC-PDCCH is located according to default time slot format related information (SFI).

18. The electronic device according to claim 9, wherein the processing circuit receives the control information related to the data in the previous time slot through the GC-PDCCH when the control information related to the data in the previous time slot is not transmitted in the previous time slot.

19. The method according to claim 17, further comprising transmitting the control information related to the data in the previous time slot through the GC-PDCCH when the control information related to the data in the previous time slot is not transmitted in the previous time slot.

* * * * *